(12) United States Patent
Seomoon et al.

(10) Patent No.: US 11,119,600 B2
(45) Date of Patent: Sep. 14, 2021

(54) PRESSURE SENSOR AND DISPLAY DEVICE INCLUDING THE SAME

(71) Applicant: Samsung Display Co., Ltd., Yongin-si (KR)

(72) Inventors: Hee Seomoon, Hwaseong-si (KR); Won Ki Hong, Suwon-si (KR); So Hee Park, Cheonan-si (KR); Hyeon Jun Lee, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/919,107

(22) Filed: Jul. 2, 2020

(65) Prior Publication Data

US 2021/0096720 A1    Apr. 1, 2021

(30) Foreign Application Priority Data

Sep. 30, 2019    (KR) ........................ 10-2019-0120671

(51) Int. Cl.
*G06F 3/041*    (2006.01)
(52) U.S. Cl.
CPC ............................... *G06F 3/04144* (2019.05)
(58) Field of Classification Search
CPC ...... G06F 3/04144; G06F 3/041; G06F 3/044; G06F 3/0414–04146
See application file for complete search history.

(56) References Cited

U.S. PATENT DOCUMENTS

| | | | |
|---|---|---|---|
| 7,538,760 B2 | 5/2009 | Hotelling et al. | |
| 7,847,789 B2 | 12/2010 | Kolmykov-Zotov et al. | |
| 8,660,978 B2 | 2/2014 | Hinckley et al. | |
| 9,244,545 B2 | 1/2016 | Hinckley et al. | |
| 10,402,033 B2 | 9/2019 | Hong | |
| 2006/0017709 A1 | 1/2006 | Okano | |
| 2006/0092139 A1 | 5/2006 | Sharma | |
| 2006/0109252 A1* | 5/2006 | Kolmykov-Zotov ........................ G06F 3/04186 345/173 |
| 2007/0152976 A1* | 7/2007 | Townsend ........... G06F 3/04186 345/173 |

(Continued)

FOREIGN PATENT DOCUMENTS

| | | |
|---|---|---|
| JP | 2006-039686 | 2/2006 |
| KR | 10-2006-0057518 | 5/2006 |
| KR | 10-2018-0028093 | 3/2018 |

*Primary Examiner* — Temesghen Ghebretinsae
*Assistant Examiner* — Ivelisse Martinez Quiles
(74) *Attorney, Agent, or Firm* — H.C. Park & Associates, PLC

(57) ABSTRACT

A pressure sensor for a display device, includes: a plurality of touch cells having a plurality of driving electrodes disposed on a first substrate, a plurality of sensing electrodes disposed on a second substrate overlapping the first substrate, and a pressure sensing layer interposed between the plurality of driving electrodes and the plurality of sensing electrodes, the driving electrodes and sensing electrodes overlapping each other; and a touch driver to drive the plurality of touch cells and to detect touch pressure of the plurality of touch cells; wherein, when a plurality of touch areas including at least one touch cell are detected, the touch driver is configured to compare magnitude of touch pressures of the plurality of touch areas and to ignore at least one touch input in at least one touch area.

17 Claims, 23 Drawing Sheets

(56) References Cited

U.S. PATENT DOCUMENTS

| | | |
|---|---|---|
| 2014/0028575 A1 | 1/2014 | Parivar et al. |
| 2014/0085213 A1 | 3/2014 | Huppi et al. |
| 2014/0091857 A1 | 4/2014 | Bernstein |
| 2014/0092064 A1 | 4/2014 | Bernstein et al. |
| 2014/0293145 A1 | 10/2014 | Jones et al. |
| 2015/0338303 A1* | 11/2015 | Williams ............ G06F 3/04144 73/1.08 |
| 2017/0300166 A1* | 10/2017 | Rosenberg .............. G06F 3/045 |
| 2017/0336891 A1* | 11/2017 | Rosenberg .......... G06F 3/04166 |
| 2018/0074637 A1* | 3/2018 | Rosenberg .......... G06F 3/04166 |
| 2018/0329576 A1* | 11/2018 | Kim ..................... G06F 3/0446 |
| 2019/0163314 A1* | 5/2019 | Kim ................... G06F 3/04144 |
| 2020/0064960 A1* | 2/2020 | Munemoto ......... G06F 3/04186 |

* cited by examiner

FIG. 7
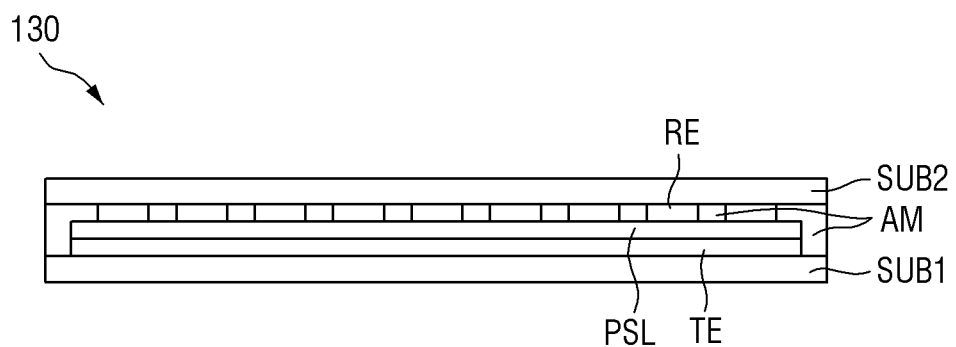
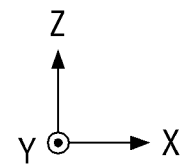
FIG. 8
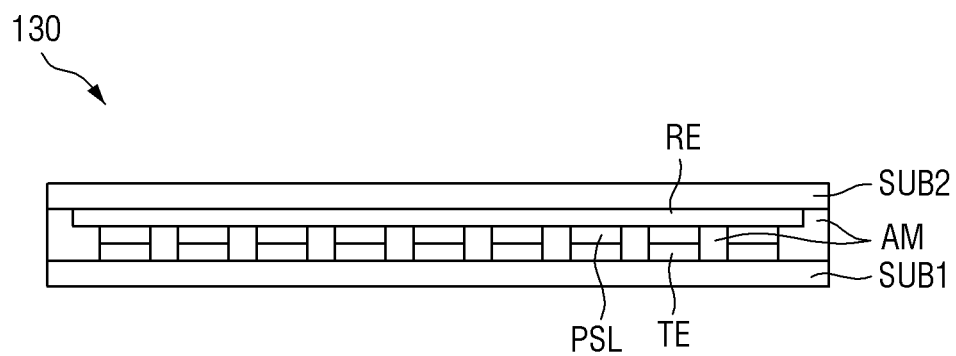
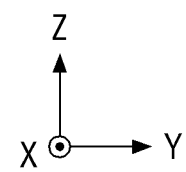

PRESSURE SENSOR AND DISPLAY DEVICE INCLUDING THE SAME

CROSS REFERENCE TO RELATED APPLICATION

This application claims priority from and the benefit of Korean Patent Application No. 10-2019-0120671 filed on Sep. 30, 2019, which is hereby incorporated by reference for all purposes as if fully set forth herein.

BACKGROUND

Field

Exemplary implementations of the invention relate generally to a pressure sensor and, more particularly, to a display device having a touch panel including the same.

Discussion of the Background

Electronic devices such as smart phones, tablet personal computers (PCs), digital cameras, notebook computers, navigation systems, and smart TVs, which provide images to users, include display devices for displaying images. The display devices include a display panel for generating and displaying an image and various input devices.

Recently, touch panels that recognize touch inputs are being widely applied to display devices mainly in smart phones or tablet PCs. Due to the convenience of the touch method, the touch panel may replace a keypad or the like, which is the conventional physical input device. In addition to the touch panel, a pressure sensor which is mounted on a display device and used as an input device has been studied.

The above information disclosed in this Background section is only for understanding of the background of the inventive concepts, and, therefore, it may contain information that does not constitute prior art.

SUMMARY

Pressure sensors and display devices including the same constructed according to the principles and exemplary implementations of the invention are capable of distinguishing a touch input intended by a user from an accidental touch input not intended by the user.

Pressure sensors and display devices including the same constructed according to exemplary implementations of the invention are capable of outputting a touch signal having a predetermined magnitude from a plurality of touch cells regardless of the difference in load resistance between the plurality of touch cells.

Additional features of the inventive concepts will be set forth in the description which follows, and in part will be apparent from the description, or may be learned by practice of the inventive concepts.

According to one aspect of the invention, a pressure sensor for a display device, includes: a plurality of touch cells having a plurality of driving electrodes disposed on a first substrate, a plurality of sensing electrodes disposed on a second substrate overlapping the first substrate, and a pressure sensing layer interposed between the plurality of driving electrodes and the plurality of sensing electrodes, the driving electrodes and sensing electrodes overlapping each other; and a touch driver to drive the plurality of touch cells and to detect touch pressure of the plurality of touch cells; wherein, when a plurality of touch areas including at least one touch cell are detected, the touch driver is configured to compare magnitude of touch pressures of the plurality of touch areas and to ignore at least one touch input in at least one touch area.

The touch driver may be configured to detect touch cells having a maximum value of the magnitude of the touch pressure in each of the plurality of touch areas and to compare the magnitudes of the touch pressures of the touch cells.

The touch driver may be configured to compare the magnitude of touch pressure of a first touch cell having a maximum value in a first touch area to the magnitude of touch pressure of a second touch cell in a second touch area and to generate a touch signal of the first touch cell or a touch signal of the second touch cell.

When the magnitude of the touch pressure of the first touch cell is greater than the magnitude of the touch pressure of the second touch cell, the touch driver may be configured to generate a first touch signal on the basis of a position of the first touch cell and the magnitude of the touch pressure.

When the magnitude of the touch pressure of the second touch cell is smaller than the magnitude of the touch pressure of the first touch cell, the touch driver may be configured to ignore a touch input in the second touch area.

When the magnitude of the touch pressure of the second touch cell is less than or equal to about 90% of the magnitude of the touch pressure of the first touch cell, the touch driver may be configured to ignore a touch input in the second touch area.

When the magnitude of the touch pressure of the second touch cell exceeds about 90% of the magnitude of the touch pressure of the first touch cell, the touch driver may be configured to additionally generate a second touch signal on the basis of a position of the second touch cell and the magnitude of the touch pressure.

When a distance between the first touch cell and the second touch area is greater than or equal to a predetermined level and a size of the second touch area is greater than or equal to a predetermined level, the touch driver may be configured to ignore a touch input in the second touch area.

When a distance between the first touch cell and the second touch area is at least about 20 mm and a size of the second touch area is at least about 400 mm$^2$, the touch driver may be configured to ignore a touch input in the second touch area.

When a distance between the first touch cell and the second touch area is less than about 20 mm or a size of the second touch area is less than about 400 mm$^2$, the touch driver may be configured to additionally generate a second touch signal on the basis of a position of the second touch cell and the magnitude of the touch pressure.

The plurality of driving electrodes may extend in a first direction on the first substrate and may be spaced apart from each other in a second direction generally perpendicular to the first direction; and the plurality of sensing electrodes may extend in the second direction on the second substrate and may be spaced apart from each other in the first direction.

The touch driver may be electrically connected to a first end of each of the driving electrodes through driving electrode lines and may be configured to increase a gain for a touch input signal generated from a touch cell adjacent to a second end opposite to the first end of the driving electrode to be greater than a gain for a touch input signal generated from a touch cell which may be adjacent to the first end of the driving electrode.

The touch driver may be electrically connected to a first end of each of the sensing electrodes through sensing electrode lines and may be configured to increase a gain for a touch input signal generated from a touch cell adjacent to a second end opposite to the first end of the sensing electrode to be greater than a gain for a touch input signal generated from a touch cell adjacent to the first end of the sensing electrode.

When a load resistance between some touch cells of the plurality of touch cells and the touch driver is relatively increased, the touch driver may be configured to increase a gain for a touch input signal generated from the some touch cells, and when a load resistance between some other touch cells of the plurality of touch cells and the touch driver is relatively reduced, the touch driver may be configured to decrease a gain for a touch input signal generated from the some other touch cells.

According to another aspect of the invention, a pressure sensor for a display device includes: a plurality of touch cells having a plurality of driving electrodes disposed on a first substrate, a plurality of sensing electrodes disposed on a second substrate overlapping the first substrate, and a pressure sensing layer interposed between the plurality of driving electrodes and the plurality of sensing electrodes overlapping each other; and a touch driver to drive the plurality of touch cells and to detect touch pressure of the plurality of touch cells; wherein the touch driver may be configured to control a gain for a touch input signal of each of the plurality of touch cells on the basis of a load resistance between each of the plurality of touch cells and the touch driver.

The plurality of driving electrodes may extend in a first direction on the first substrate and may be spaced apart from each other in a second direction perpendicular to the first direction; and the plurality of sensing electrodes may extend in the second direction on the second substrate and may be spaced apart from each other in the first direction.

The touch driver may be electrically connected to a first end of each of the driving electrodes through a driving electrode line and may be configured to increase a gain for a touch input signal generated from a touch cell adjacent to a second end opposite to the first end of the driving electrode to be greater than a gain for a touch input signal generated from a touch cell adjacent to the one end of the driving electrode.

The touch driver may be electrically connected to a first end of each of the sensing electrodes through a sensing electrode line and may be configured to increase a gain for a touch input signal generated from a touch cell adjacent to a second end opposite to the one end of the sensing electrode to be greater than a gain for a touch input signal generated from a touch cell adjacent to the first end of the sensing electrode.

When a load resistance between some touch cells of the plurality of touch cells and the touch driver may be relatively increased, the touch driver may be configured to increase a gain for a touch input signal generated from the some touch cells, and when a load resistance between some other touch cells of the plurality of touch cells and the touch driver is relatively reduced, the touch driver may be configured to decrease a gain for a touch input signal generated from the some other touch cells.

According to another aspect of the invention, a display device includes: a display panel to display an image; and a pressure sensor disposed on one surface of the display panel; wherein the pressure sensor may include: a plurality of touch cells having a plurality of driving electrodes disposed on a first substrate, a plurality of sensing electrodes disposed on a second substrate overlapping the first substrate, and a pressure sensing layer interposed between the plurality of driving electrodes and the plurality of sensing electrodes overlapping each other, and a touch driver to drive the plurality of touch cells and to detect touch pressure of the plurality of touch cells, wherein when a plurality of touch areas including at least one touch cell is detected, the touch driver may be configured to compare magnitudes of touch pressures of the plurality of touch areas and to ignore at least one touch input in at least one touch area.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 7 is a cross-sectional view taken along an X-axis direction illustrating the first pressure sensor of FIG. 6.

FIG. 8 is a cross-sectional view taken along a Y-axis direction illustrating the first pressure sensor of FIG. 6.

DETAILED DESCRIPTION OF THE EMBODIMENTS

Figure 1:
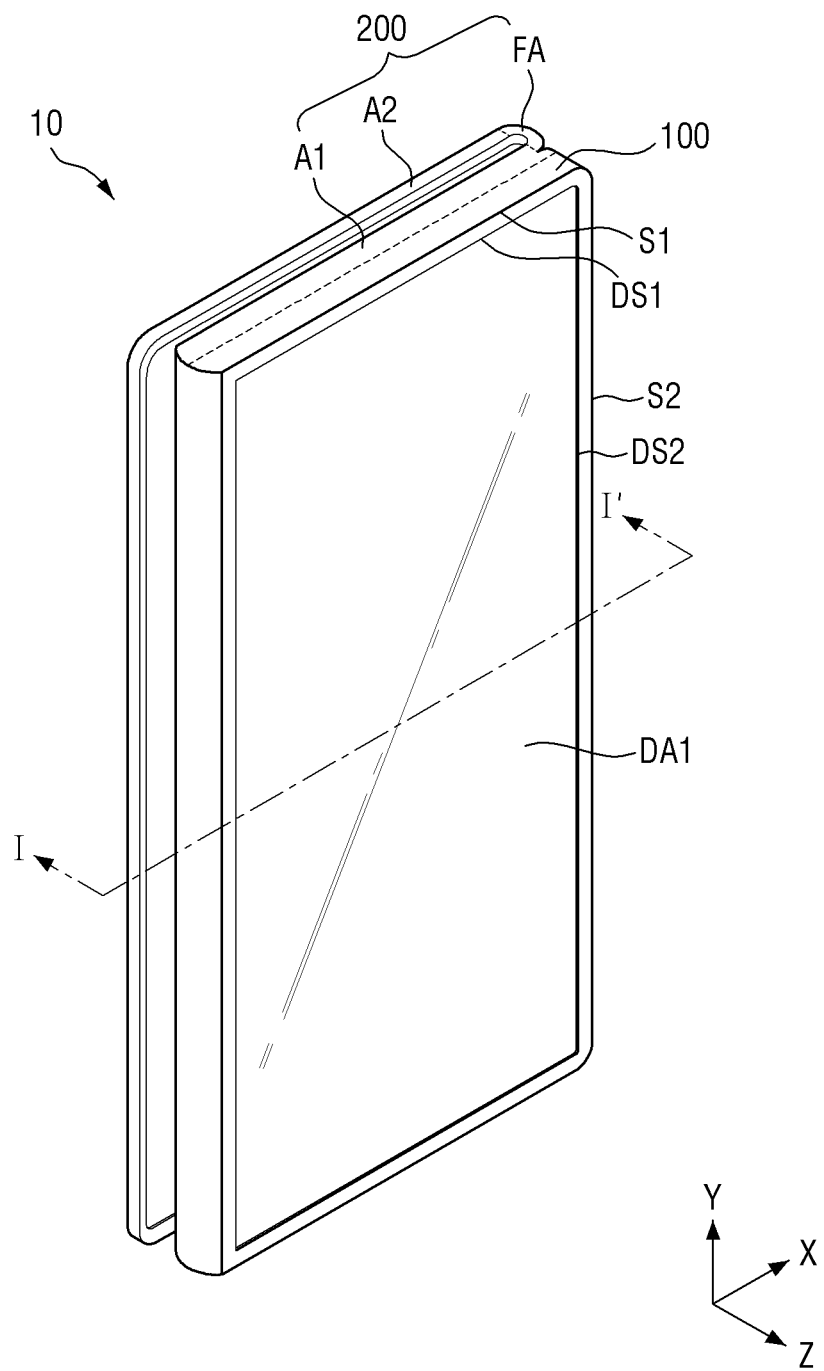
FIG. 1 is a perspective view of an exemplary embodiment illustrating a foldable display device constructed according to the principles of the invention in a folded position.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly. Additionally, the terms "upper portion," "top," "upper surface," and "upper end" used herein are referred to as portions in an upward direction, that is, in a Z-axis direction based on the display device, and the terms "lower portion," "bottom," "lower surface," and "lower end" are referred to as portions in a downward direction, that is, in a direction opposite to the Z-axis direction based on the display device. In addition, "left," "right," "upward," and "downward" directions indicate directions when the display device is viewed from above. For example, the right direction indicates an X-axis direction, the left direction indicates a direction opposite to the X-axis direction, the upward direction indicates a Y-axis direction, and the downward direction indicates a direction opposite to the Y-axis direction.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
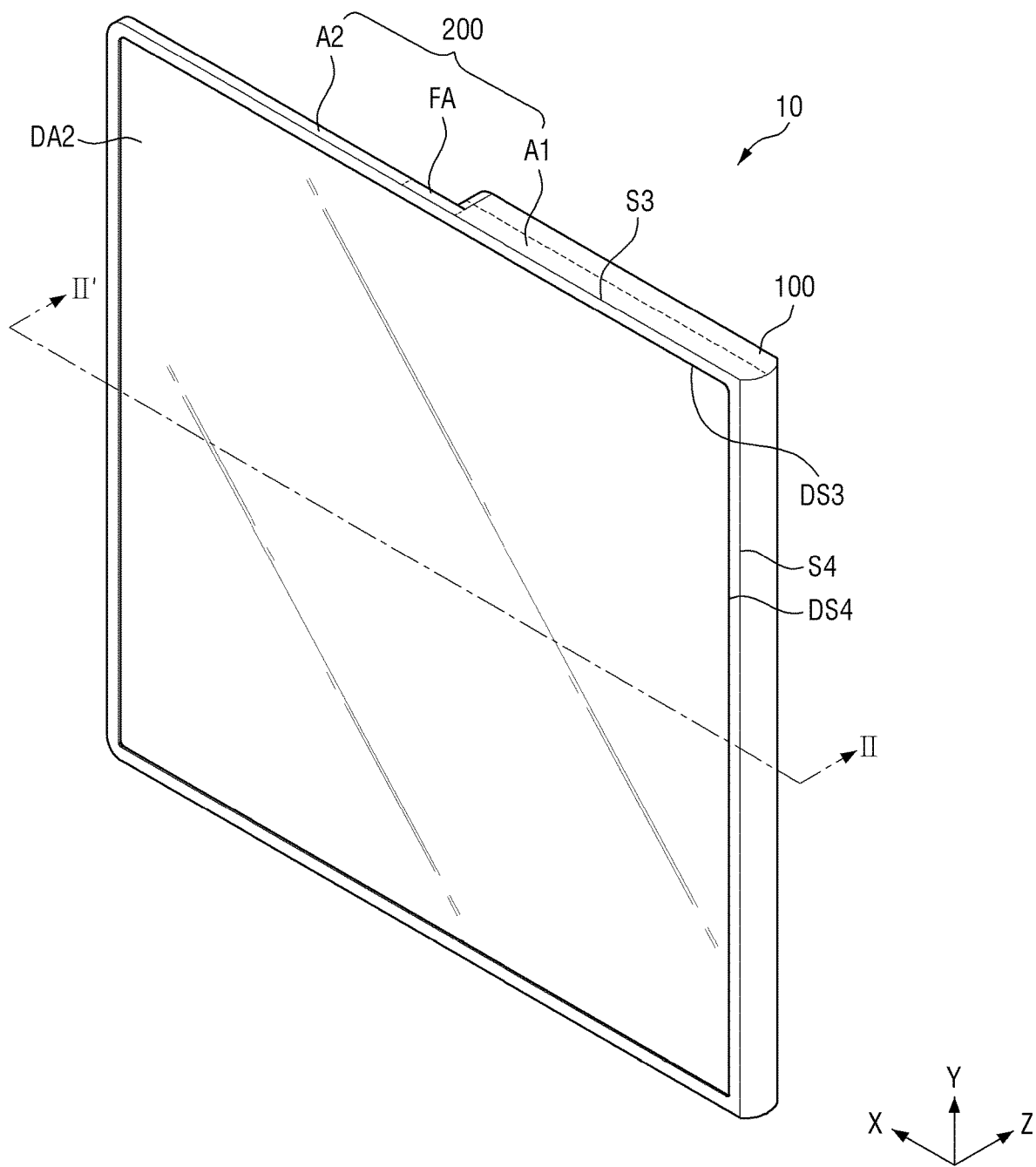
FIG. 2 is a perspective view illustrating the foldable display device of FIG. 1 in an unfolded position.

FIG. 1 is a perspective view of an exemplary embodiment illustrating a foldable display device constructed according to the principles of the invention in a folded position. FIG. 2 is a perspective view illustrating the foldable display device of FIG. 1 in an unfolded position.

Referring to FIGS. 1 and 2, the display device 10 may include a first display unit 100 having a first display region DA1 and a second display unit 200 having a second display region DA2.

The first display unit 100 may have a generally rectangular shape in a plan view. For example, the first display unit 100 may have first sides S1 in a first direction (X-axis direction) and second sides S2 in a second direction (Y-axis direction). The length of each of the first sides S1 may be smaller than the length of each of the second sides S2. A corner at which any one of the first sides S1 and any one of the second sides S2 meet may be generally rounded to have a generally predetermined curvature or formed at a generally right angle. As another example, the first display unit 100 may have a generally polygonal, circular, or oval planar shape instead of a generally rectangular planar shape.

The first display region DA1 of the first display unit 100 may have first display sides DS1 generally parallel to the first sides S1 in the first direction (X-axis direction) and second display sides DS2 generally parallel to the second sides S2 in the second direction (Y-axis direction). For example, the length of each of the first display sides DS1 may be smaller than the length of each of the second display sides DS2. A corner at which any one of the first display sides DS1 and any one of the second display sides DS2 meet may be generally rounded have a generally predetermined curvature or formed at a generally right angle. The first display region DA1 may have a generally polygonal, circular, or oval planar shape instead of a generally rectangular planar shape.

The second display unit 200 may include a first region A1, a second region A2, and a folding region FA disposed between the first region A1 and the second region A2. The second display unit 200 may be folded as illustrated in FIG. 1 or unfolded as illustrated in FIG. 2 according to the state of the folding region FA. The second display unit 200 may be formed in a generally rectangular shape in the plan view in the unfolded state. The second display unit 200 may have third sides S3 in the first direction (X-axis direction) and fourth sides S4 in the second direction (Y-axis direction). For example, the length of each of the third sides S3 may be greater than the length of each of the fourth sides S4. In some exemplary embodiments, a user may watch a screen having long sides in the first direction (X-axis direction). In other exemplary embodiments, the length of each of the third sides S3 may be smaller than the length of each of the fourth sides S4. In the illustrated exemplary embodiment, the user may watch a screen having long sides in the second direction (Y-axis direction). In some exemplary embodiments, the length of each of the third sides S3 may be substantially identical to the length of each of the fourth sides S4. In the illustrated exemplary embodiment, the user may watch a generally square screen. A corner at which any one of the third sides S3 and any one of the fourth sides S4 meet may be generally rounded to have a generally predetermined curvature or formed at a right angle. The second display unit 200 may have a generally polygonal, circular, or oval planar shape instead of a generally rectangular planar shape.

The second display region DA2 of the second display unit 200 may have third display sides DS3 generally parallel to the third sides S3 in the first direction (X-axis direction) and fourth display sides DS4 generally parallel to the fourth sides S4 in the second direction (Y-axis direction) in the unfolded state. For example, the length of each of the third display sides DS3 may be greater than the length of each of the fourth display sides DS4. In some exemplary embodiments, the length of each of the third display sides DS3 may be smaller than the length of each of the fourth display sides DS4. In other exemplary embodiments, the length of each of the third display sides DS3 may be substantially identical to the length of each of the fourth display sides DS4. A corner at which any one of the third display sides DS3 and any one of the fourth display sides DS4 meet may be generally rounded to have a generally predetermined curvature or formed at a generally right angle. The second display region DA2 may have a generally polygonal, circular, or oval planar shape instead of a generally rectangular planar shape.

In some exemplary embodiments, the second display unit 200 may include a flexible substrate which is bendable, foldable, or rollable and thus may be easily folded at the first folding region FA. In other exemplary embodiments, the second display unit 200 may include a hinge disposed on one surface of the second display unit 200 in order to facilitate folding of the folding region FA.

When the second display unit 200 is folded as illustrated in FIG. 1, the second display region DA2 of the first region A1 and the second display region DA2 of the second region A2 may be inwardly folded to face each other. The second display unit 200 may be bent at a generally predetermined curvature at the folding region FA so that the second display region DA2 of the second display unit 200 may be folded. For example, the first display region DA1 of the first display unit 100 may face a third direction (Z-axis direction), and the second display region DA2 of the second display unit 200 may face a direction opposite to the third direction (Z-axis direction).

The display device 10 may display an image in the third direction (Z-axis direction) when the first display unit 100 in the second display unit 200 is folded. The display device 10 may display an image in the direction opposite to the third direction (Z-axis direction) when the second display unit 200 in the second display unit 200 is unfolded. In the illustrated exemplary embodiment, the first display unit 100 may display an image in the third direction (Z-axis direction) or may not display any image.

Figure 3:
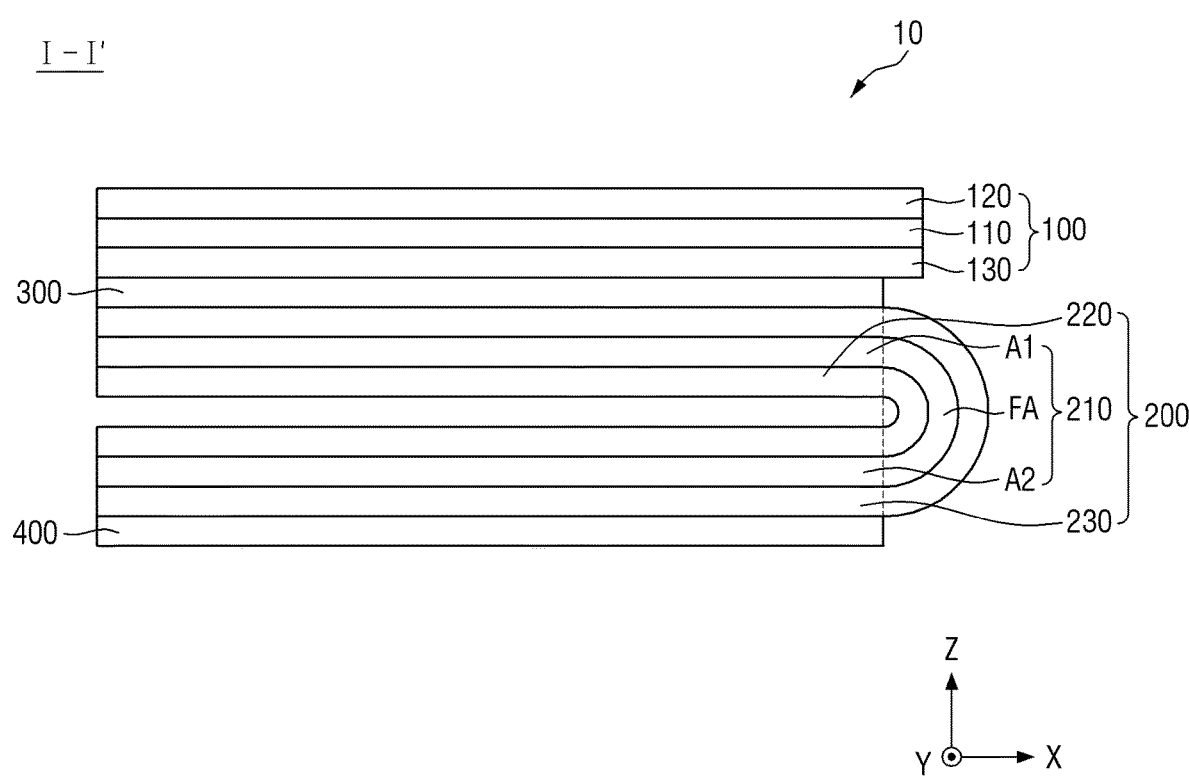
FIG. 3 is a cross-sectional view taken along line I-I' of FIG. 1.
Figure 4:
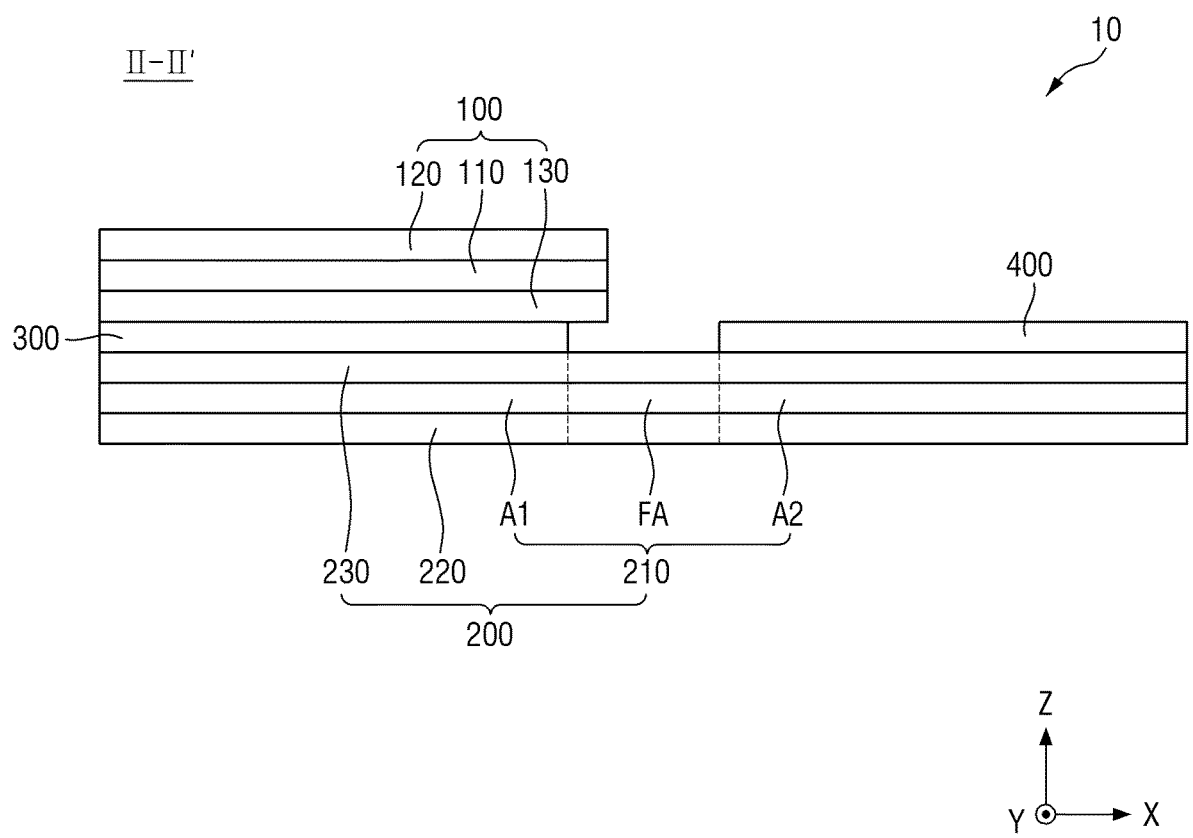
FIG. 4 is a cross-sectional view taken along line II-II' of FIG. 2.

FIG. 3 is a cross-sectional view taken along line I-I' of FIG. 1. FIG. 4 is a cross-sectional view taken along line II-II' of FIG. 2.

Referring to FIGS. 3 and 4, the display device 10 may include a first display unit 100, a second display unit 200, a first panel lower member 300, and a second panel lower member 400.

The first display unit 100 may display an image in a third direction (Z-axis direction). The first display unit 100 may be disposed on one surface of the first panel lower member 300 and supported by the first panel lower member 300. The first display unit 100 may include a first display panel 110, a first cover window 120, and a first pressure sensor 130.

The first display panel 110 may be an organic light-emitting display panel using organic light-emitting diodes (LEDs), a micro light-emitting diode display panel using micro LEDs, a quantum dot light-emitting display panel including quantum dot LEDs, or other known display panel. Hereinafter, it is assumed for descriptive convenience that the first display panel 110 is an organic light-emitting display panel. The first display panel 110 may be disposed closer to the first cover window 120 than the first pressure sensor 130, thereby improving image quality of the display device 10.

The first cover window 120 may be disposed above the first display panel 110. The first cover window 120 may cover an upper surface of the first display panel 110 to protect the first display panel 110. The first cover window 120 may be attached onto the first display panel 110 by a transparent adhesive member. The first cover window 120 may correspond to a surface of a first display region DA1 and may be brought into direct contact with a user's body. For example, the first cover window 120 may be made of at least one material of a glass, a sapphire, and a plastic. The first cover window 120 may be formed to be rigid or flexible.

The first pressure sensor 130 may be disposed below the first display panel 110. The first pressure sensor 130 may detect a user's touch generated on the first cover window 120. The first pressure sensor 130 may overlap substantially the entire surface of the first display panel 110. The first pressure sensor 130 may overlap substantially the entire surface of the first cover window 120. For example, the first pressure sensor 130 may include a plurality of touch cells which overlap the entire surface of the first display panel 110 or the entire surface of the first cover window 120. Of the plurality of touch cells of the first pressure sensor 130, the resistance value of the touch cell that is subjected to pressure by a touch may be changed according to the magnitude of the pressure. Therefore, the first pressure sensor 130 may detect the position at which the touch is generated on the basis of the position of the touch cell whose the resistance value is changed and detect the magnitude of the touch pressure on the basis of a degree of change in the resistance value.

The second display unit 200 may be folded as illustrated in FIG. 3 or unfolded as illustrated in FIG. 4 according to a state of the folding region FA. The second display unit 200 may display an image in a direction opposite to the third direction (Z-axis direction) in the unfolded state. The second display unit 200 may include a second display panel 210, a second cover window 220, and a second pressure sensor 230.

The second display panel 210 may be an organic light-emitting display panel using organic LEDs, a micro light-emitting diode display panel using micro LEDs, a quantum dot light-emitting display panel including quantum dot LEDs, or other known display panel.

The second display panel 210 may include a first region A1, a second region A2, and a folding region FA disposed between the first region A1 and the second region A2. In some exemplary embodiments, the second display panel 210 may include a flexible substrate which is bendable, foldable, or rollable, and thus may be easily folded at the folding region FA. In other exemplary embodiments, the second display panel 210 may include a hinge disposed on one surface of the second display unit 200 in order to complement a folding function of the folding region FA.

The first region A1 of the second display panel 210 may be disposed on the other surface opposite to one surface of the first panel lower member 300 and supported by the first panel lower member 300. The first region A1 of the second display panel 210 and the first display panel 110 may be opposite to each other with the first panel lower member 300 interposed therebetween.

The second region A2 of the second display panel 210 may be connected to the first region A1 through the folding region FA. When the folding region FA of the second display panel 210 is folded as illustrated in FIG. 3, the second region A2 of the second display panel 210 may overlap the first region A1 in the third direction (Z-axis direction). When the folding region FA of the second display panel 210 is unfolded as illustrated in FIG. 4, the second region A2 of the second display panel 210 may be generally coplanar with the folding region FA and the first region A1.

The second region A2 of the second display panel 210 may be disposed on one surface of the second panel lower member 400 and supported by the second panel lower member 400.

The second cover window 220 may be disposed on one surface of the second display panel 210. The second cover window 220 may cover the one surface of the second display panel 210 to protect the second display panel 210. The second cover window 220 may be attached to the one surface of the second display panel 210 by a transparent adhesive member. The second cover window 220 may correspond to a surface of a second display region DA2 and may be brought into direct contact with the user's body. For example, the second cover window 220 may be made of at least one material of a glass, a sapphire, and a plastic. A portion of the second cover window 220 may overlap the folding region FA of the second display panel 210, and at least a portion of the second cover window 220 may be formed to be flexible.

The second pressure sensor 230 may be disposed on the other surface opposite to the one surface of the second display panel 210. The second pressure sensor 230 may detect the user's touch generated on the second cover window 220. The second pressure sensor 230 may overlap substantially the entire surface of the second display panel 210. The second pressure sensor 230 may overlap substantially the entire surface of the second cover window 220. In some exemplary embodiments, the second pressure sensor 230 may include a plurality of touch cells which overlap the entire surface of the second display panel 210 or the entire surface of the second cover window 220. Of the plurality of touch cells of the second pressure sensor 230, the resistance value of the touch cell that is subjected to pressure by a touch may be changed according to the magnitude of the pressure. Therefore, the second pressure sensor 230 may detect a position at which the touch is generated on the basis of a position of the touch cell whose resistance value is changed and detect the magnitude of touch pressure on the basis of a degree of change in the resistance value.

The first panel lower member 300 may be disposed between the first display unit 100 and the first region A1 of the second display panel 210. One surface of the first panel lower member 300 may support the first display unit 100 and the other surface of the first panel lower member 300 may support the first region A1 of the second display panel 210. In some exemplary embodiments, the one surface of the first panel lower member 300 may directly support the first pressure sensor 130 of the first display unit 100. The one surface of the first panel lower member 300 may indirectly support the first display panel 110 and the first cover window 120. The other surface of the first panel lower member 300 may directly support a portion of the second pressure sensor 230 which overlaps the first region A1 of the second display panel 210. The other surface of the first panel lower member 300 may indirectly support the first region A1 and a portion of the second cover window 220 which overlaps the first region A1.

The first panel lower member 300 may include a buffer member and a heat dissipation member. The buffer member of the first panel lower member 300 may absorb an external impact to prevent the first display unit 100 and the portion of the second display unit 200 which overlaps the first region A1 from being damaged. In some exemplary embodiments, the buffer member of the first panel lower member 300 may be formed of a single layer or multiple layers made of a polymer resin such as at least one of a polyurethane, a polycarbonate, a polypropylene, a polyethylene, or the like. In some exemplary embodiments, the first panel lower member 300 may be made of a material having elasticity, such as a rubber, or a sponge obtained by foaming a urethane-based material or an acrylic-based material.

In some exemplary embodiments, the heat dissipation member of the first panel lower member 300 may include a graphite or carbon nanotubes to block electromagnetic waves. In other exemplary embodiments, the heat dissipation member of the first panel lower member 300 may be formed of a metal thin film having excellent thermal conductivity, such as at least one of copper (Cu), nickel (Ni), ferrite (Fr), or silver (Ag), to emit heat generated in the first display unit 100 or the second display unit 200.

The second panel lower member 400 may support the second display unit 200. The second panel lower member 400 may directly support a portion of the second pressure sensor 230 which overlaps the second region A2 and may indirectly support the second region A2 and a portion of the second cover window 220 which overlaps the second region A2.

When the second display unit 200 is folded as illustrated in FIG. 3, the second panel lower member 400 may overlap the first panel lower member 300 in the third direction (Z-axis direction). When the second display unit 200 is unfolded as illustrated in FIG. 4, the second panel lower member 400 may be generally coplanar with the first panel lower member 300. As illustrated in FIG. 4, the first panel lower member 300 and the second panel lower member 400 may be spaced apart from each other by the width of the folding region FA.

The second panel lower member 400 may include a buffer member and a heat dissipation member. The buffer member of the second panel lower member 400 may absorb an external impact to prevent the portion of the second display unit 200 which overlaps the second region A2 from being damaged. For example, the buffer member of the second panel lower member 400 may be formed of a single layer or multiple layers made of a polymer resin such as at least one of a polyurethane, a polycarbonate, a polypropylene, a polyethylene, or the like. As another example, the second panel lower member 400 may be made of a material having elasticity, such as a rubber, or a sponge obtained by foaming a urethane-based material or an acrylic-based material.

In some exemplary embodiments, the heat dissipation member of the second panel lower member 400 may include a graphite or carbon nanotubes to block electromagnetic waves. In other exemplary embodiments, the heat dissipation member of the second panel lower member 400 may be formed of a metal thin film having excellent thermal conductivity, such as at least one of copper (Cu), nickel (Ni), ferrite (Fr), or silver (Ag), to emit heat generated in the second display unit 200.

Figure 5:
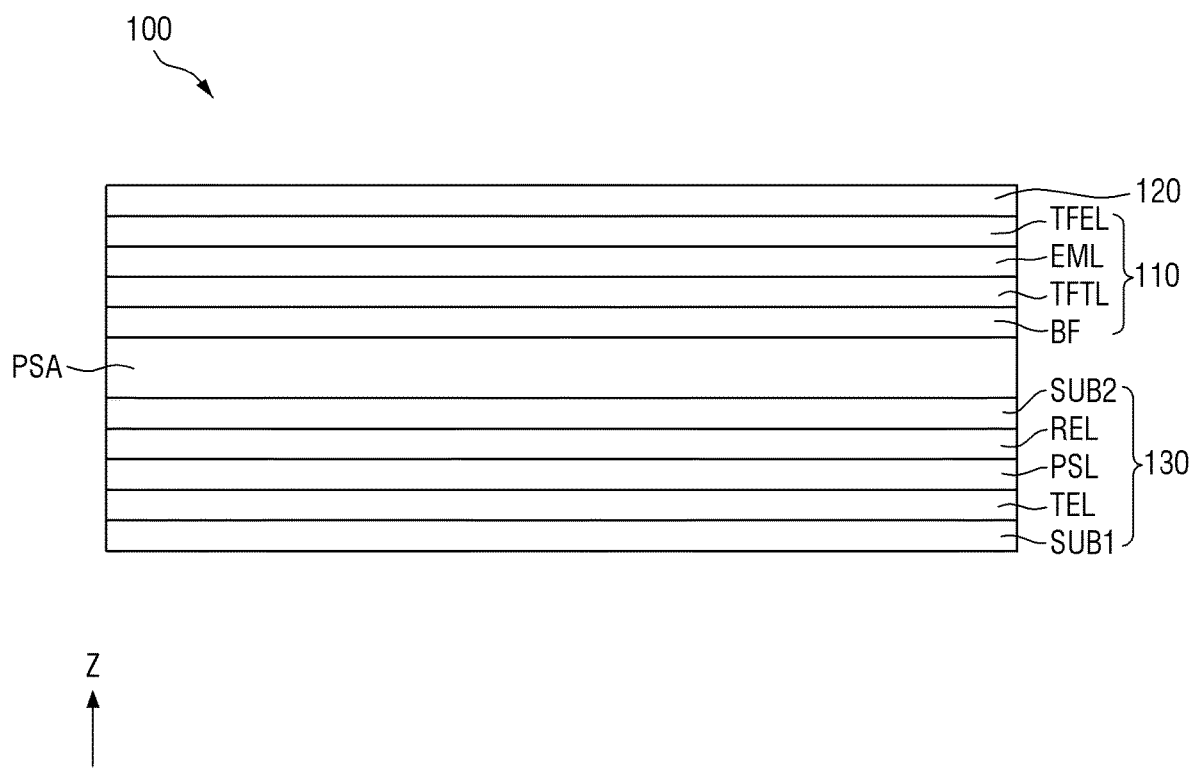
FIG. 5 is a cross-sectional view of an exemplary embodiment of a first display unit of the foldable display device of FIG. 4.

FIG. 5 is a cross-sectional view of an exemplary embodiment of a first display unit of the foldable display device of FIG. 4.

The cross-sectional view of a first display unit 100 may include a configuration substantially identical to that of a cross-sectional view of an unfolded second display unit 200. Configurations of cross sections of the first display panel 110, the first cover window 120, and the first pressure sensor 130 may respectively correspond to configurations of cross sections of the second display panel 210, the second cover window 220, and the second pressure sensor 230. Hereinafter, the configuration of the cross section of the first display unit 100 will be described in detail, and thus a description of the configuration of the cross section of the second display unit 200 will be omitted to avoid redundancy.

Referring to FIG. 5, the first display panel 110 may include a base film BF, a thin film transistor layer TFTL, a light-emitting element layer EML, and a thin film encapsulation layer TFEL.

The base film BF may be a base substrate and may be made of an insulating material such as a polymer resin or the like. For example, the base film BF may be made of a polyethersulphone (PES), a polyacrylate, (PAC), a polyarylate (PAR), a polyetherimide (PEI), a polyethylene naphthalate (PEN), a polyethylene terephthalate (PET), a polyphenylene sulfide (PPS), a polyimide (PI), a polycarbonate (PC), a cellulose triacetate (CAT), a cellulose acetate propionate (CAP), or a combination thereof. The base film BF may be a flexible substrate which is bendable, foldable, or rollable.

The thin film transistor layer TFTL may be disposed above the base film BF. The thin film transistor layer TFTL may include at least one thin film transistor for driving each of a plurality of sub-pixels. The at least one thin film transistor of the sub-pixel may include a semiconductor layer, a gate electrode, a drain electrode, and a source electrode. For example, the thin film transistor layer TFTL may further include scan lines, data lines, power lines, and scan control lines, which are connected to the at least one thin film transistor of the sub-pixel, and routing lines which connect pads to the data lines.

The light-emitting element layer EML may be disposed above the thin film transistor layer TFTL. The light-emitting element layer EML may include a light-emitting element connected to the at least one thin film transistor of the thin film transistor layer TFTL. The light-emitting element may include a first electrode, a light-emitting layer, and a second electrode. In some exemplary embodiments, the light-emitting layer may be an organic light-emitting layer made of an organic material, but exemplary embodiments are not limited thereto. In the case in which the light-emitting layer is the organic light-emitting layer, when the thin film transistor of the thin film transistor layer TFTL applies a predetermined voltage to the first electrode of the light-emitting element and the second electrode of the light-emitting element receives a common voltage or a cathode voltage, holes and electrons may move to the organic light-emitting layer through a hole transport layer and an electron transport layer, respectively, and the holes and the electrons may be combined with each other in the organic light-emitting layer to emit light.

The light-emitting element layer EML may include a pixel definition film which defines the plurality of sub-pixels. The first electrode and the light-emitting layer of the light-emitting element may be spaced apart from and insulated from each other by the pixel definition film.

The thin film encapsulation layer TFEL may be disposed above the light-emitting element layer EML to cover the thin film transistor layer TFTL and the light-emitting element layer EML. The thin film encapsulation layer TFEL may prevent oxygen or moisture from penetrating into the light-emitting element layer EML. For example, the thin film encapsulation layer TFEL may include at least one inorganic film. The thin film encapsulation layer TFEL may include an inorganic film such as a silicon nitride layer, a silicon oxynitride layer, a silicon oxide layer, a titanium oxide layer, or an aluminum oxide layer, but exemplary embodiments are not limited thereto.

The thin film encapsulation layer TFEL may protect the light-emitting element layer EML from foreign matter such as dust. In some exemplary embodiments, the thin film encapsulation layer TFEL may include at least one organic film. The thin film encapsulation layer TFEL may include an organic film such as an acrylic resin, an epoxy resin, a phenolic resin, a polyamide resin, or a polyimide resin, but exemplary embodiments are not limited thereto.

The first cover window 120 may be disposed above the thin film encapsulation layer TFEL. The first cover window 120 may cover an upper surface of the thin film encapsulation layer TFEL to protect the first display panel 110.

The first pressure sensor 130 may be disposed below the base film BF. The first pressure sensor 130 may include a first substrate SUB1, a driving electrode layer TEL, a pressure sensing layer PSL, a sensing electrode layer REL, and a second substrate SUB2.

The first substrate SUB1 and the second substrate SUB2 may be opposite to each other with the driving electrode layer TEL, the pressure sensing layer PSL, and the sensing electrode layer REL interposed therebetween. In some exemplary embodiments, each of the first substrate SUB1 and the second substrate SUB2 may be made of at least one of a polyethersulphone (PES), a polyacrylate (PAC), a polyarylate (PAR), a polyetherimide (PEI), a polyethylene naphthalate (PEN), a polyethylene terephthalate (PET), a polyphenylene sulfide (PPS), a polyimide (PI), a polycarbonate (PC), a cellulose triacetate (CAT), a cellulose acetate propionate (CAP), or a combination thereof.

The driving electrode layer TEL may be disposed on the first substrate SUB1. The driving electrode layer TEL may include a plurality of driving electrodes. Each of the plurality of driving electrodes may be connected to a touch driver through a driving electrode line and may receive a touch driving voltage from the touch driver.

The sensing electrode layer REL may be disposed on the second substrate SUB2. The sensing electrode layer REL and the driving electrode layer TEL may be opposite to each other with the pressure sensing layer PSL interposed between. The sensing electrode layer REL may include a plurality of sensing electrodes. Each of the plurality of sensing electrodes may be connected to the touch driver through a sensing electrode line and may supply a touch input signal to the touch driver.

Resistance values of a plurality of touch cells including the plurality of driving electrodes of the driving electrode layer TEL, the pressure sensing layer PSL, and the plurality of sensing electrodes of the sensing electrode layer REL may be changed according to pressure applied to the plurality of touch cells. In some exemplary embodiments, the resistance values of the touch cells may decrease as the pressure applied to the plurality of touch cells increases. When the pressure applied to the plurality of touch cells is relatively low, the change in resistance value of the touch cell may be insignificant. The touch driver may sense a change in current value or voltage value of the touch input signal according to the change in resistance value of the plurality of touch cells connected to the sensing electrode line. Therefore, since the touch driver may sense the pressure when pressed by a hand of the user, the first pressure sensor 130 may be used as an input device which senses a user's touch input.

The pressure sensing layer PSL may be disposed between the driving electrode layer TEL and the sensing electrode layer REL The pressure sensing layer PSL may overlap the plurality of driving electrodes and the plurality of sensing electrodes to form the plurality of touch cells.

The pressure sensing layer PSL may include a polymer resin having a pressure sensitive material. The pressure sensitive material may be fine metal particles (or metal nanoparticles) such as at least one of nickel (Ni), aluminum (Al), titanium (Ti), tin (Sn), copper (Cu), and the like. For example, the pressure sensing layer PSL may be quantum tunneling composites (QTCs).

The first display unit 100 may further include an adhesive layer PSA which bonds the first display panel 110 and the first pressure sensor 130. The adhesive layer PSA may be disposed between a lower portion of the base film BF and an upper portion of the second substrate SUB2. In some exemplary embodiments, the adhesive layer PSA may be an optically cleared adhesive film (OCA) or an optically cleared resin (OCR).

Figure 6:
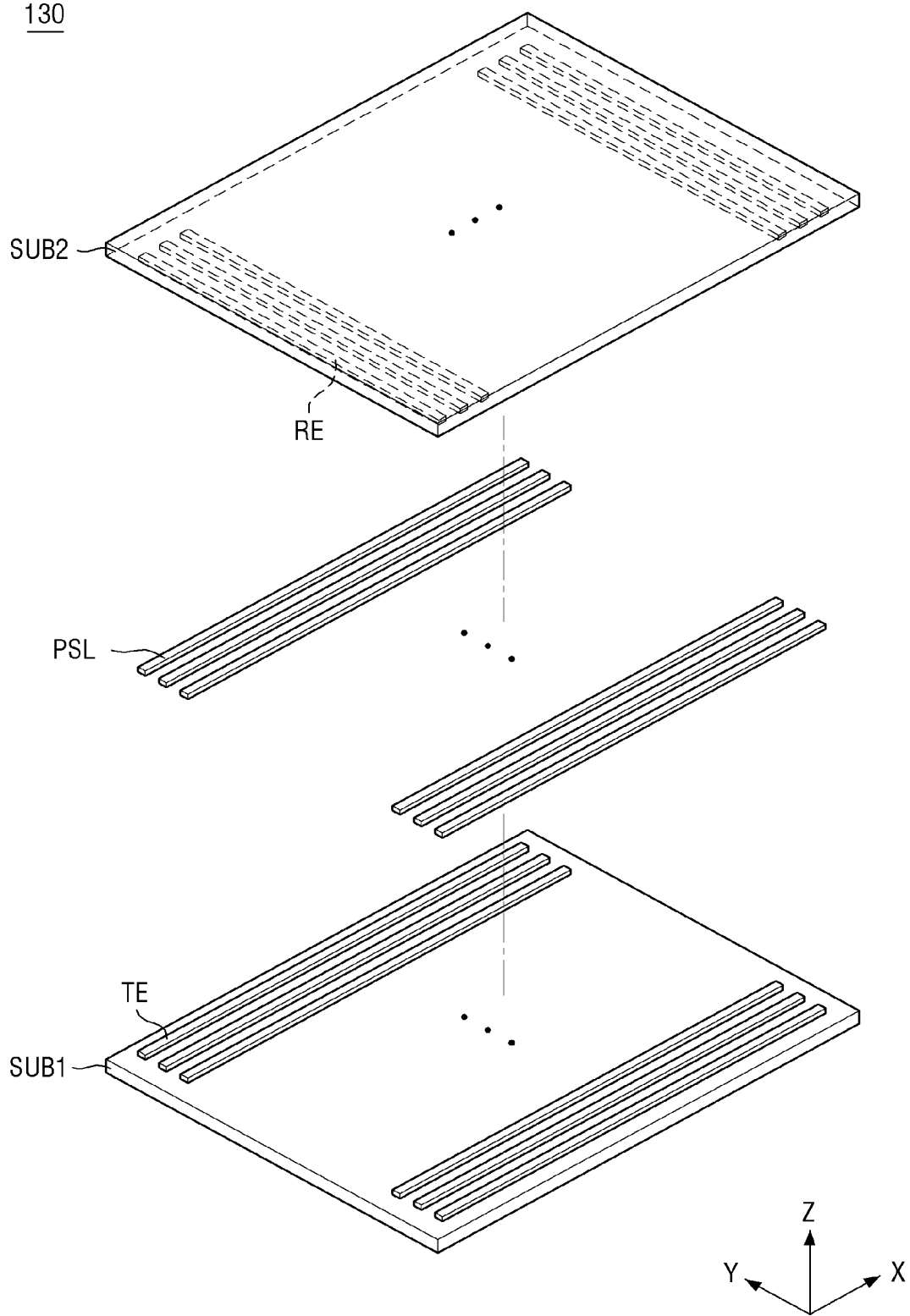
FIG. 6 is an exploded perspective view of an exemplary embodiment of a first pressure sensor of the display device constructed according to the principles of the invention.

FIG. 6 is an exploded perspective view of an exemplary embodiment of a first pressure sensor of the display device constructed according to the principles of the invention. FIG. 7 is a cross-sectional view taken along an X-axis direction illustrating the first pressure sensor of FIG. 6. FIG. 8 is a cross-sectional view taken along a Y-axis direction illustrating the first pressure sensor of FIG. 6.

The configuration of the first pressure sensor 130 may be substantially identical to the configuration of a second pressure sensor 230. Hereinafter, the configuration of the first pressure sensor 130 will be described in detail, and thus a description of the configuration of the second pressure sensor 230 will be omitted to avoid redundancy.

Referring to FIGS. 6 to 8, the first pressure sensor 130 may include a first substrate SUB1, a plurality of driving electrodes TE, a pressure sensing layer PSL, a plurality of sensing electrodes RE, a second substrate SUB2, and an adhesive member AM.

The plurality of driving electrodes TE may be disposed on the first substrate SUB1. The plurality of driving electrodes TE may each extend in a first direction (X-axis direction) and may be spaced apart from each other in a second direction (Y-axis direction) generally perpendicular to the first direction (X-axis direction). Each of the plurality of driving electrodes TE may be connected to a touch driver through a driving electrode line and may receive a touch driving voltage from the touch driver. In some exemplary embodiments, the plurality of driving electrodes TE may include a conductive material such as at least one of silver (Ag), copper (Cu), or the like. The plurality of driving electrodes TE may be formed on the first substrate SUB1 by screen printing, but exemplary embodiments are not limited thereto.

The pressure sensing layer PSL may be formed on the plurality of driving electrodes TE. The pressure sensing layer PSL may be patterned along an arrangement of the plurality of driving electrodes TE. A plurality of patterns of the pressure sensing layer PSL may extend in the first direction (X-axis direction) and may be spaced apart from each other in the second direction (Y-axis direction) generally perpendicular to the first direction (X-axis direction). Therefore, the plurality of patterns of the pressure sensing layer PSL may intersect the plurality of sensing electrodes RE.

The pressure sensing layer PSL may be disposed between the plurality of driving electrodes TE and the plurality of sensing electrodes RE. The pressure sensing layer PSL may overlap the plurality of driving electrodes TE and the plurality of sensing electrodes RE to form the plurality of touch cells.

The plurality of touch cells may correspond to respective regions in which the plurality of driving electrodes TE, the pressure sensing layer PSL, and the plurality of sensing electrodes RE overlap each other. Resistance value of the plurality of touch cells may be changed according to pressure applied to the plurality of touch cells. In some exemplary embodiments, the resistance values of the touch cells may decrease as the pressure applied to the plurality of touch cells increases. When the pressure applied to the plurality of touch cells is relatively low the change in resistance value of the touch cell may be insignificant. The touch driver may sense a change in current value or voltage value of a touch input signal according to a change in resistance value of the plurality of touch cells connected to sensing electrode lines. Therefore, since the touch driver may sense the pressure when pressed by a hand of the user, the first pressure sensor 130 may be used as an input device which senses a user's touch input.

The pressure sensing layer PSL may include a polymer resin having a pressure sensitive material. The pressure sensitive material may be fine metal particles (or metal nanoparticles) such as at least one of nickel (Ni), aluminum (Al), titanium (Ti), tin (Sn), copper (Cu), and the like. For example, the pressure sensing layer PSL may be QTCs.

The plurality of sensing electrodes RE may be disposed on the second substrate SUB2. The plurality of sensing electrodes RE may each extend in the second direction (Y-axis direction) and may be spaced apart from each other in the first direction (X-axis direction). The plurality of sensing electrodes RE may intersect the plurality of driving electrodes TE. The second substrate SUB2 on which the plurality of sensing electrodes RE are formed may be bonded to the first substrate SUB1 on which the plurality of driving electrodes TE and the pressure sensing layer PSL are formed.

The adhesive member AM may bond the first substrate SUB1 to the second substrate SUB2 while filling a gap between the first substrate SUB1 and the second substrate SUB2. The adhesive member AM may cover a region between the first substrate SUB1 and the second substrate SUB2 in which the plurality of touch cells are not formed. The adhesive member AM may insulate each of the plurality of driving electrodes TE from each of the plurality of sensing electrodes RE and prevent the plurality of driving electrodes TE and the plurality of sensing electrodes RE from being exposed to the outside and being oxidized. The adhesive member AM may prevent the plurality of driving electrodes TE and the plurality of sensing electrodes RE from being brought into direct contact with each other even when the first pressure sensor 130 receives pressure from the outside.

Figure 9:
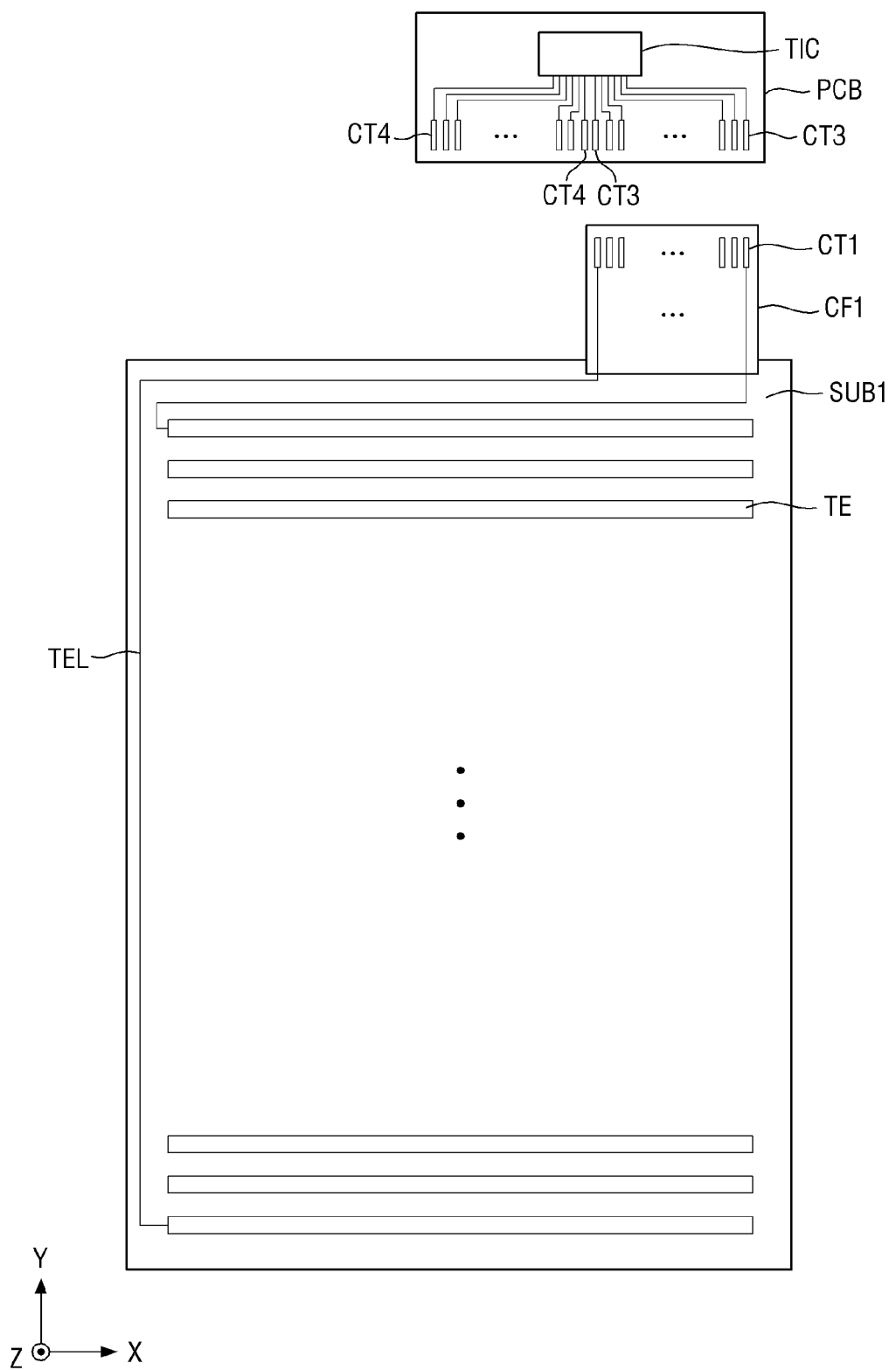
FIG. 9 is a plan view of an exemplary embodiment illustrating a first substrate and a printed circuit board of a display device constructed according to the principles of the invention.
Figure 10:
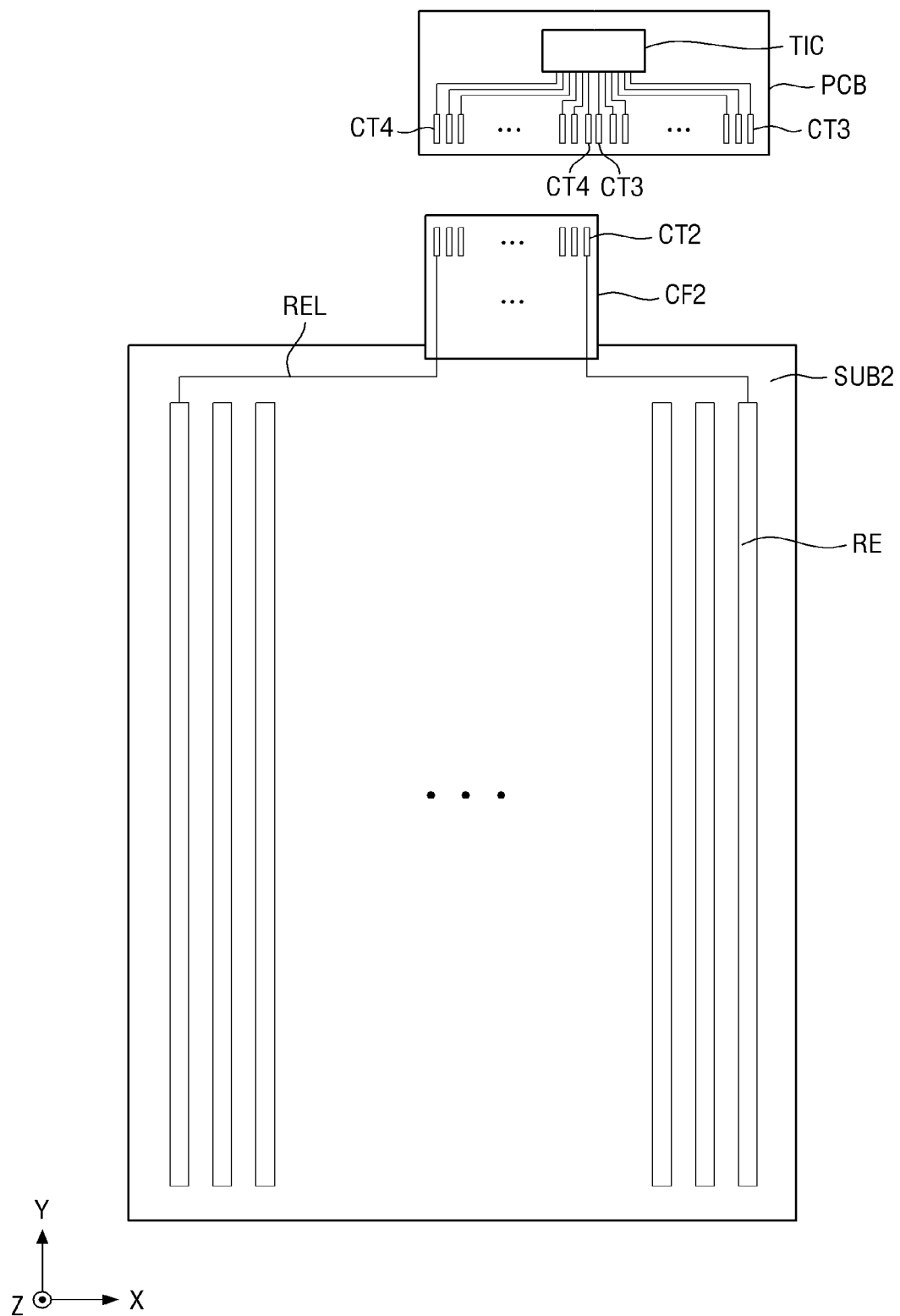
FIG. 10 is a plan view of an exemplary embodiment illustrating a second substrate and a printed circuit board of a display device constructed according to the principles of the invention.
Figure 11:
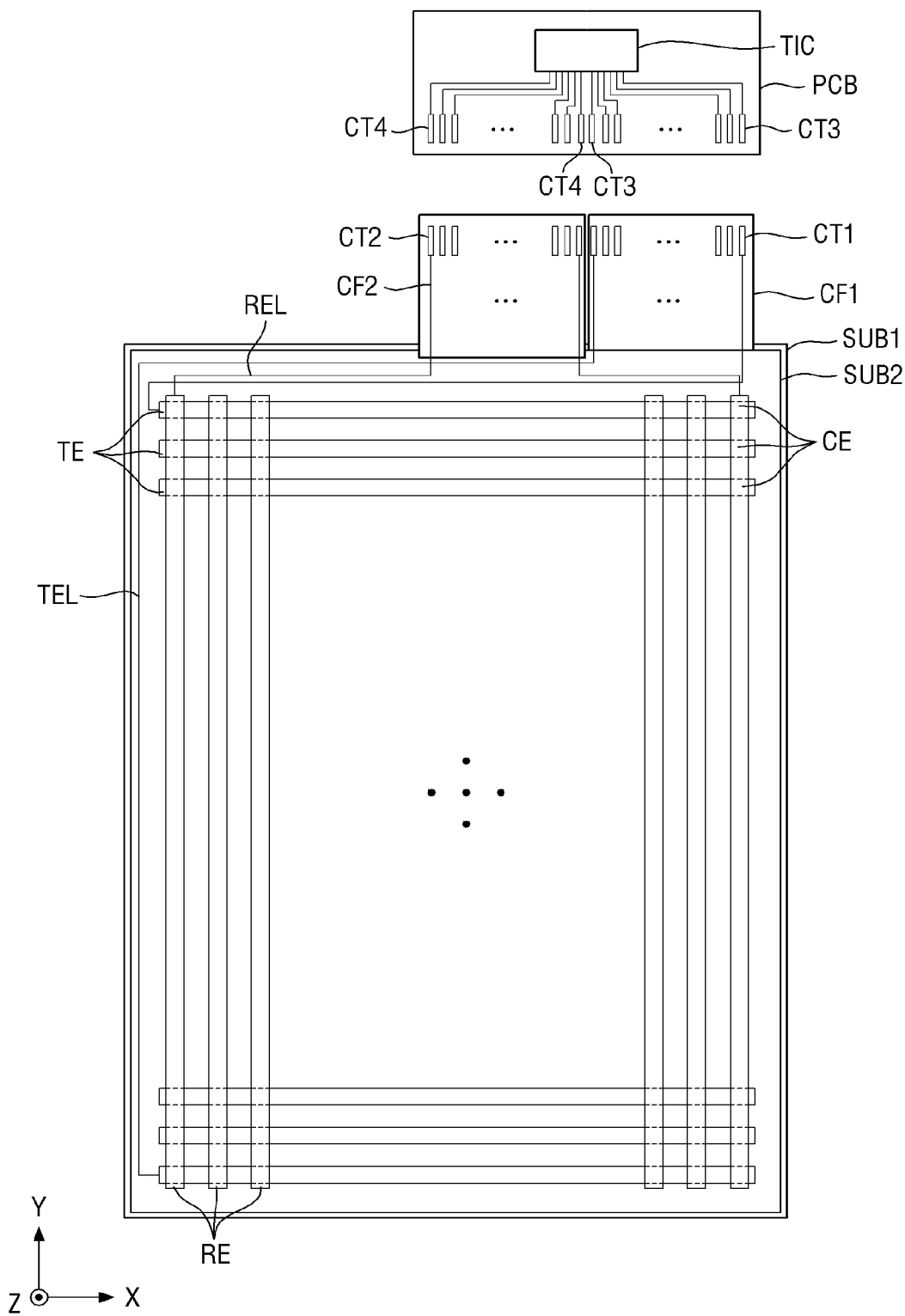
FIG. 11 is a plan view illustrating the first substrate and the second substrate of FIGS. 9-10 being bonded to each other.

FIG. 9 is a plan view of an exemplary embodiment illustrating a first substrate and a printed circuit board of a display device constructed according to the principles of the invention. FIG. 10 is a plan view of an exemplary embodiment illustrating a second substrate and a printed circuit board of a display device constructed according to the principles of the invention. FIG. 11 is a plan view illustrating the first substrate and the second substrate of FIGS. 9-10 being bonded to each other.

Referring to FIGS. 9 to 11, a first pressure sensor 130 may further include a touch driver TIC for driving the first pressure sensor 130, and a printed circuit board PCB on which the touch driver TIC is mounted.

The touch driver TIC may be disposed on the printed circuit board PCB to measure a change in resistance of a plurality of touch cells CE. The plurality of touch cells CE may be formed for each region in which a plurality of driving electrodes TE, a pressure sensing layer PSL, and a plurality of sensing electrodes RE overlap. In some exemplary embodiments, the plurality of touch cells CE may be spaced apart from each other by an arrangement interval (pitch) of the plurality of driving electrodes TE in a second direction (Y-axis direction) and spaced apart from each other a pitch of the plurality of sensing electrodes RE in a first direction (X-axis direction).

The touch driver TIC may detect a position of a user's touch and the magnitude of touch pressure on the basis of the change in resistance of the plurality of touch cells CE. As used herein, the user's touch means that an object such as a user's finger or a pen is brought into direct contact with a surface of the first display unit 100. In addition, the touch driver TIC may distinguish a touch input which is intended by the user from a touch input which is not intended by the user to accurately detect the user's touch input.

Of the plurality of touch cells CE, resistance values of some touch cells CE that are subjected to the touch pressure may be changed according to the magnitude of the touch pressure, and resistance values of some other touch cells CE that are not subjected to the touch pressure may not be changed. The touch cells CE that are subjected to the touch pressure may constitute at least one touch area according to whether the touch cells CE are adjacent to each other. When the user's touches are generated in the plurality of touch areas, the touch driver TIC may detect the touch cell CE having a maximum magnitude value of the touch pressure in each of the plurality of touch areas and compare the magnitudes of the touch pressures of the touch cells CE having the maximum magnitude value of the touch pressure. The touch driver TIC may accurately detect the user's touch input by ignoring the touch inputs in meaningless touch areas on the basis of the comparison result of the magnitudes of the touch pressures of the touch cells CE.

The printed circuit board PCB may be connected to a first substrate SUB1 through a first circuit film CF1 and connected to a second substrate SUB2 through a second circuit film CF2. Third connection terminals CT3 of the printed circuit board PCB may be respectively connected to first connection terminals CT1 of the first circuit film CF1, and fourth connection terminals CT4 of the printed circuit board PCB may be respectively connected to second connection terminals CT2 of the second circuit film CF2. For example, the printed circuit board PCB may be a flexible printed circuit board (FPCB), a printed circuit board (PCB), or a flexible film such as a chip on film (COF).

The touch driver TIC may be connected to the third connection terminals CT3 or the fourth connection terminals CT4 of the printed circuit board PCB through lead lines of the printed circuit board PCB.

As illustrated in FIG. 9, the touch driver TIC may be connected to the third connection terminals CT3 of the printed circuit board PCB through the lead lines, and the first connection terminals CT1 of the first circuit film CF1 may be respectively connected to the plurality of driving electrodes TE disposed on the first substrate SUB1 through driving electrode lines TEL. Therefore, the touch driver TIC may be electrically connected to the plurality of driving electrodes TE through the lead lines, the third connection terminals CT3, the first connection terminals CT1, and the driving electrode lines TEL. For example, one end of each of the plurality of driving electrodes TE may be connected to the driving electrode line TEL on the left side of the first substrate SUB1. The plurality of driving electrodes TE may extend to be generally parallel in the first direction (X-axis direction).

As illustrated in FIG. 10, the touch driver TIC may be connected to the fourth connection terminals CT4 of the printed circuit board PCB through the lead lines, and the second connection terminals CT2 of the second circuit film CF2 may be connected to the plurality of sensing electrodes RE disposed on the second substrate SUB2 through sensing electrode lines REL. Therefore, the touch driver TIC may be electrically connected to the plurality of sensing electrodes RE through the lead lines, the fourth connection terminals CT4, the second connection terminals CT2, and the sensing electrode lines REL. In some exemplary embodiments, one end of each of the plurality of sensing electrodes RE may be connected to the sensing electrode line REL on the upper side of the second substrate SUB2. The plurality of sensing electrodes RE may extend to be generally parallel in a direction opposite to the second direction (Y-axis direction).

As illustrated in FIG. 11, the driving electrode lines TEL may be formed on the first substrate SUB1 to connect the plurality of driving electrodes TE to the first connection terminals CT1 of the first circuit film CF1, and the sensing electrode lines REL may be formed on the second substrate SUB2 to connect the plurality of sensing electrodes RE to the second connection terminals CT2 of the second circuit film CF2. The driving electrode lines TEL and the sensing electrode lines REL may be insulated from each other by an adhesive member AM disposed between the first substrate SUB1 and the second substrate SUB2.

Figure 12:
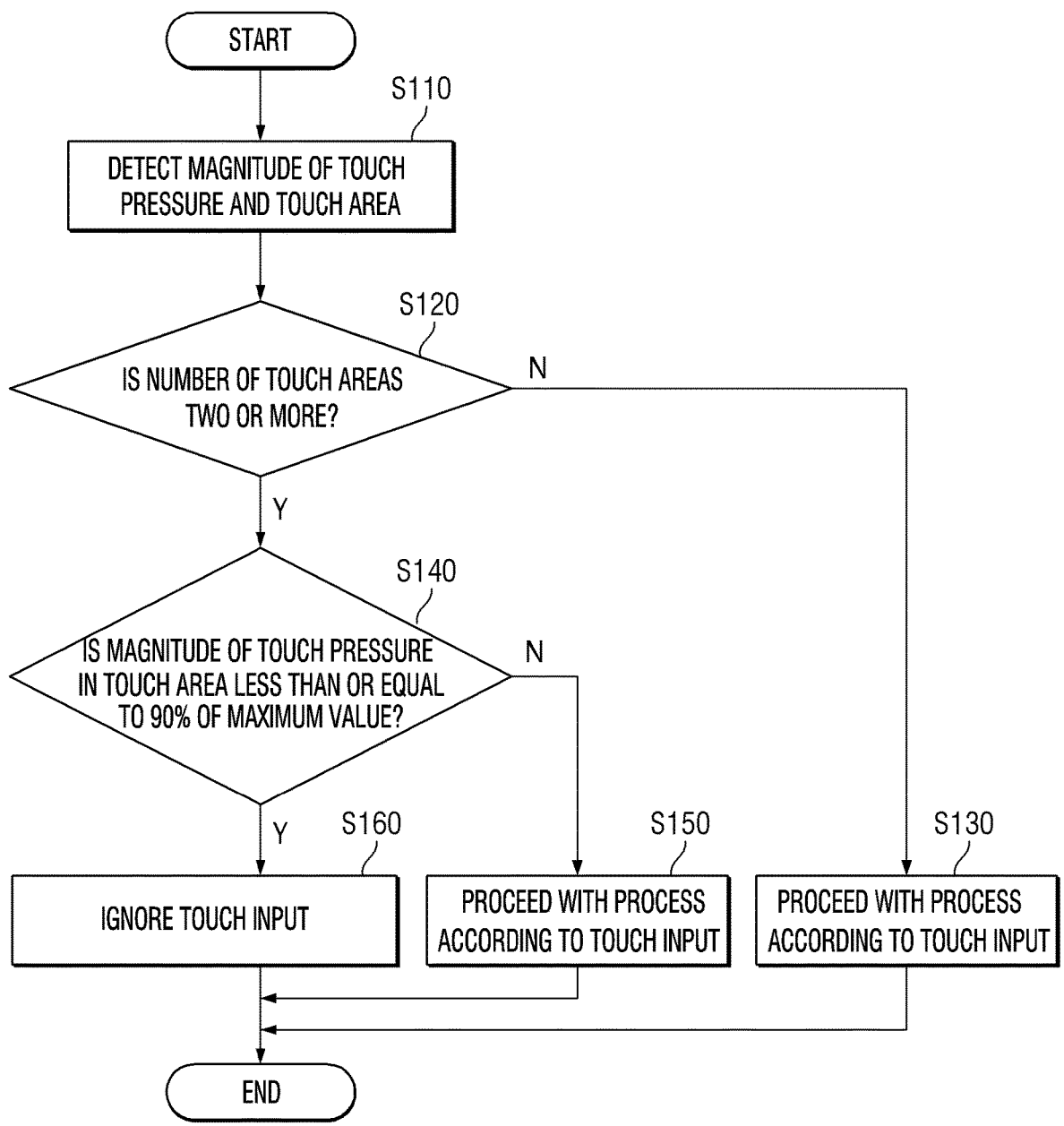
FIG. 12 is a flowchart illustrating an exemplary process of processing a plurality of touch inputs of a display device according to principles of the invention.
Figure 13:
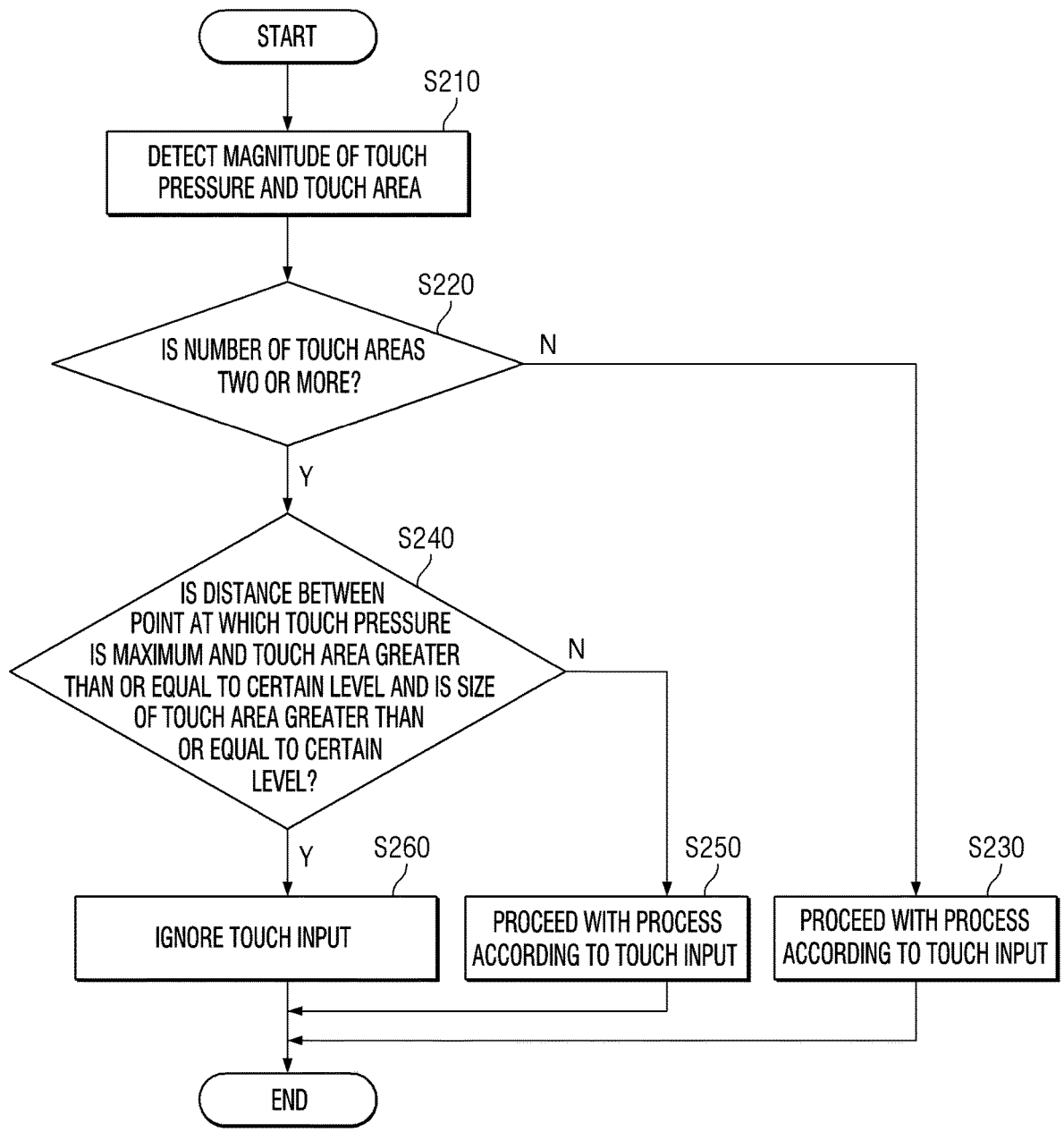
FIG. 13 is a flowchart illustrating another exemplary process of processing the plurality of touch inputs of the display device according to principles of the invention.
Figure 14:
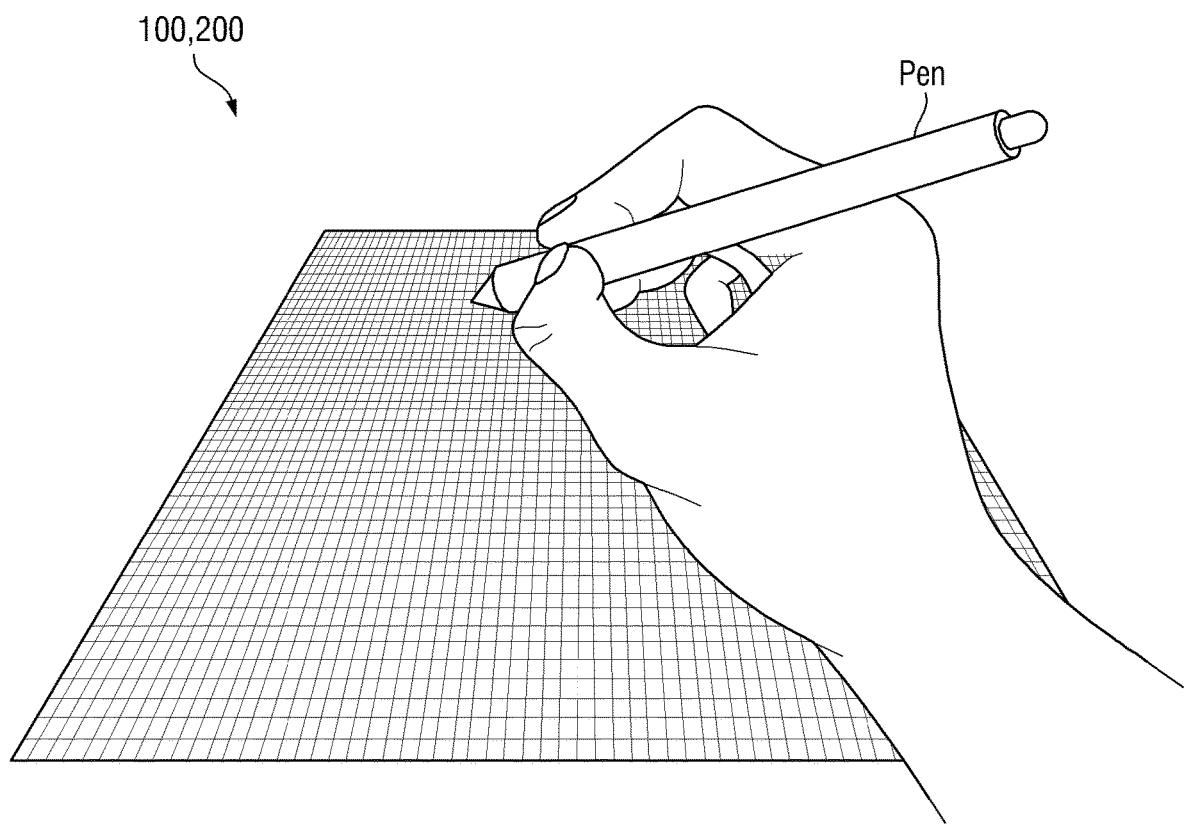
FIG. 14 is a perspective view illustrating a first display unit or a second display unit of an exemplary embodiment of a display device being touched according to principles of the invention.
Figure 15:
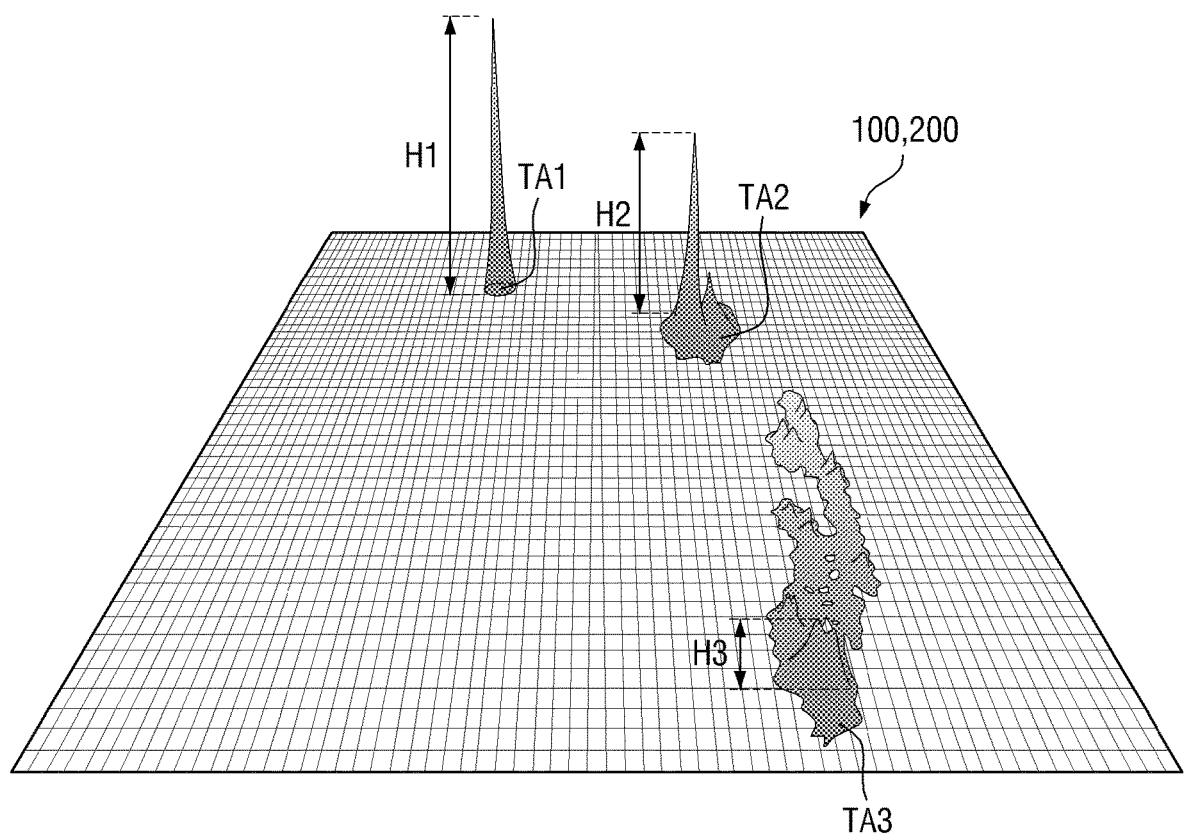
FIG. 15 is a perspective view illustrating a first display unit or a second display unit of another exemplary embodiment of a display device being touched according to principles of the invention.

FIG. 12 is a flowchart illustrating an exemplary process of processing a plurality of touch inputs of a display device according to principles of the invention. FIG. 13 is a flowchart illustrating another exemplary process of processing the plurality of touch inputs of the display device according to principles of the invention. FIG. 14 is a perspective view illustrating a first display unit or a second display unit of an exemplary embodiment of a display device being touched according to principles of the invention. FIG. 15 is a perspective view illustrating a first display unit or a second display unit of another exemplary embodiment of a display device being touched according to principles of the invention.

Hereinafter, the processes of FIGS. 12 and 13 will be described with reference to FIGS. 14 and 15 as examples. Referring to FIGS. 12 to 15, a first pressure sensor 130 may detect a user's touch generated on a first display unit 100, and a second pressure sensor 230 may detect a user's touch generated on a second display unit 200.

Referring to FIGS. 12 and 15, the first pressure sensor 130 may detect the magnitude of touch pressure of the user's touch generated on the first display unit 100 in a touch area (operation S110). The first pressure sensor 130 may include a plurality of touch cells CE which overlap substantially the entire surface of the first display unit 100. Some touch cells CE that are subjected to the touch pressure may constitute at least one touch area according to whether the touch cells CE are adjacent to each other. One touch area may include at least one touch cell CE.

For example, the resistance value of the touch cell CE in each of first to third touch areas TA1, TA2, and TA3 that is subjected to the touch pressure may be changed according to the magnitude of the touch pressure. Since the touch cells CE in regions except for the first to third touch areas TA1, TA2, and TA3 are not subjected to the touch pressure, resistance values of the touch cells CE may not be changed.

A touch driver TIC of the first pressure sensor 130 may determine whether the number of touch areas is two or more (operation S120).

When it is determined that the number of touch areas is one, the touch driver TIC may determine the corresponding touch input as a touch input which is intended by the user. For example, the touch driver TIC may supply a position of the corresponding touch area and the magnitude of the pressure to the main processor of the display device 10.

The main processor may proceed with a process according to the touch input (operation S130). In some exemplary embodiments, the main processor may execute an application indicated by an icon displayed at the position of the touch input. In other exemplary embodiments, the main processor may proceed with a process according to the position of the touch input and the magnitude of the pressure. In yet other exemplary embodiments, the main processor may implement a haptic device according to the position of the touch input and the magnitude of the pressure. The main processor may be an application processor, a central processing unit, or a system chip, which is composed of integrated circuits.

When it is determined that the number of touch areas is two or more, the touch driver TIC may distinguish a touch input which is intended by the user from a touch input which is not intended by the user. The touch driver TIC may detect the touch cell CE having a maximum magnitude value of the touch pressure in each of the plurality of touch areas. The touch driver TIC may compare the magnitudes of the touch pressures of the touch cells CE having the maximum magnitude values of the touch pressure in each of the touch areas to set the touch area including a reference touch cell having the largest value to the reference touch area.

For example, the touch driver TIC may detect the touch cell CE having the largest touch pressure in each of the first to third touch areas TA1, TA2, and TA3. A first touch cell having the largest touch pressure in the first touch area TA1 may be subjected to touch pressure having a first magnitude H1, a second touch cell having the largest touch pressure in the second touch area TA2 may be subjected to touch pressure having a second magnitude H2, and a third touch cell having the largest touch pressure in the third touch area TA3 may be subjected to touch pressure having a third magnitude H3. The touch driver TIC may compare the magnitudes of the touch pressures of the touch cells CE having the largest touch pressure in each of the first to third touch areas TA1, TA2, and TA3 to set the touch area including a reference touch cell which has the largest value to the reference touch area. Therefore, the touch driver TIC may set the first touch area TA1 to the reference touch area and set the first touch cell that is subjected to the touch pressure having the first magnitude H1 to the reference touch cell.

The first touch cell that is subjected to the touch pressure having the first magnitude H1 in the first touch area TA1 may be subjected to pressure greater than that of the second touch cell that is subjected to the touch pressure having the second magnitude H2 in the second touch area TA2 or the third touch cell that is subjected to the touch pressure having the third magnitude H3 in the third touch area TA3. Therefore, the first touch cell (the reference touch cell) may be subjected to the greatest touch pressure in all of the first to third touch areas TA1, TA2, and TA3. The touch driver TIC may determine the touch input in the first touch area TA1 (the reference touch area) as the touch input intended by the user. The touch driver TIC may generate a first touch signal on the basis of the position of the first touch cell and the first magnitude H1 of the pressure. The touch driver TIC may supply the first touch signal to the main processor of the display device, and the main processor may proceed with a process according to the touch input of the first touch area TA1.

The touch driver TIC may compare the magnitude of the touch pressure of the touch cell CE in each touch area to the magnitude of the touch pressure of the reference touch cell. The touch driver TIC may determine whether the magnitude of the touch pressure of the touch cell CE in each touch area is less than or equal to about 90% of the magnitude of the touch pressure of the reference touch cell (operation S140).

In some exemplary embodiments, the touch driver TIC may compare the second magnitude H2 of touch pressure of the second touch cell to the first magnitude H1 of the touch pressure of the first touch cell. In addition, the touch driver TIC may compare the third magnitude H3 of the touch pressure of the third touch cell to the first magnitude H1 of the touch pressure of the first touch cell.

The touch driver TIC may determine an input in the touch area including the touch cell having touch pressure that exceeds about 90% of the touch pressure of the reference touch cell as the touch input intended by the user. The touch driver TIC may generate a second touch signal on the basis of a position of the touch cell that exceeds about 90% of the touch pressure of the reference touch cell and the magnitude of the pressure in addition to the first touch signal. The touch driver TIC may supply the second touch signal to the main processor of the display device. The main processor may proceed with a process on the basis of the first touch signal according to the touch input in the reference touch area and the second touch signal according to the additional touch input in the touch area (operation S150). The touch input in the reference touch area and the additional touch input in the touch area may be used in combination or may be used independently of each other.

The touch driver TIC may determine an input of the touch area including the touch cells having touch pressure that are less than or equal to about 90% of the touch pressure of the reference touch cell as the touch input not intended by the user or a meaningless touch input. The touch driver TIC may ignore the touch input not intended by the user (operation S160). The touch driver TIC may not supply information about the corresponding touch input to the main processor, and the main processor may not operate due to the touch input not intended by the user.

In some exemplary embodiments, when it is determined that the second magnitude H2 of the touch pressure of the second touch cell is less than or equal to about 90% of the first magnitude H1 of the touch pressure of the first touch cell, the touch driver TIC may determine an input in the second touch area TA2 as the touch input not intended by the user. Further, when it is determined that the third magnitude H3 of the touch pressure of the third touch cell is less than or equal to about 90% of the first magnitude H1 of the touch pressure of the first touch cell, the touch driver TIC may determine an input in the third touch area TA3 as the touch input not intended by the user. Therefore, the touch driver TIC may ignore the touch input in the second touch area TA2 and the touch input in the third touch area TA3.

As illustrated in FIGS. 14 and 15, it can be seen that the first touch area TA1 is a region in which the user intends to touch using a pen and the second touch area TA2 and the third touch area TA3 are regions in which the user's palm unintentionally touches. Therefore, the pressure sensor and the display device including the same may accurately distinguish the touch input intended by the user from the touch input not intended by the user and thus reliability may be improved. In addition, the pressure sensor 130 and the display device including the same may accurately distinguish the touch input intended by the user from the touch input not intended by the user without using a separate touch device (e.g., a pen) for touch input.

Referring to FIGS. 13 and 15, the first pressure sensor 130 may detect the magnitude of touch pressure of the user's touch generated on the first display unit 100 and a touch area (operation S210). In some exemplary embodiments, the resistance value of the touch cell CE in each of first to third touch areas TA1, TA2, and TA3 that is subjected to the touch pressure may be changed according to the magnitude of the touch pressure.

The touch driver TIC of the first pressure sensor 130 may determine whether the number of touch areas is two or more (operation S220).

When it is determined that the number of touch areas is one, the touch driver TIC may determine the corresponding touch input as a touch input which is intended by the user. In some exemplary embodiments, the touch driver TIC may supply the position of the corresponding touch area and the magnitude of the pressure to the main processor of the display device.

The main processor may proceed with a process according to the touch input (operation S230). In some exemplary embodiments, the main processor may execute an application indicated by an icon displayed at the position of the touch input. In other exemplary embodiments, the main processor may proceed with a process according to the position of the touch input and the magnitude of the pressure. In still other exemplary embodiments, the main processor may implement a haptic device according to the position of the touch input and the magnitude of the pressure.

When it is determined that the number of touch areas is two or more, the touch driver TIC may compare the magnitudes of the touch pressures of the touch cells CE having the largest touch pressure in each of the touch areas to set the touch area including a reference touch cell having the largest value to a reference touch area. In some exemplary embodiments, the touch driver TIC may set the first touch area TA1 to the reference touch area and set the first touch cell that is subjected to the touch pressure having the first magnitude H1 to the reference touch cell. The touch driver TIC may determine the touch input in the first touch area TA1 (or the reference touch area) as the touch input intended by the user. The touch driver TIC may generate a first touch signal on the basis of a position of the first touch cell and the first magnitude H1 of the pressure. The touch driver TIC may supply the first touch signal to the main processor of the display device, and the main processor may proceed with a process according to the touch input of the first touch area TA1.

The touch driver TIC may calculate the distance between the reference touch cell in the reference touch area and the remaining touch areas except for the reference touch area. The touch driver TIC may determine whether the distance between the reference touch cell and the remaining touch areas is greater than or equal to a certain level and areas of the remaining touch area are greater than or equal to a certain level (operation S240).

The touch driver TIC may determine whether the distance between the first touch cell that is subjected to the greatest touch pressure on the first display unit 100 and the second touch area TA2 is greater than or equal to a certain level and whether the size of the second touch area TA2 is greater than or equal to a certain level. In some exemplary embodiments, the touch driver TIC may determine whether the distance between the first touch cell and the second touch area TA2 is greater than or equal to about 20 mm and determine whether the size of the second touch area TA2 is greater than or equal to about 400 mm$^2$.

When it is determined that the distance between the first touch cell and the second touch area TA2 is less than the certain level and the size of the second touch area TA2 is less than the certain level, the touch driver TIC may determine an input in the second touch area TA2 as the touch input intended by the user. In some exemplary embodiments, when it is determined that the distance between the first touch cell and the second touch area TA2 is less than about 20 mm or the size of the second touch area TA2 is less than about 400 mm$^2$, the touch driver TIC may determine the input in the second touch area TA2 as the touch input intended by the user. The touch driver TIC may generate a second touch signal on the basis of the position of the second touch area TA2 and the magnitude of the pressure of the second touch cell in the second touch area TA2. The touch driver TIC may supply the second touch signal to the main processor of the display device, and the main processor may proceed with a process on the basis of the first touch signal according to the touch input in the first touch area TA1 and the second touch signal according to the additional touch input in the second touch area TA2 (operation S250). The touch input in the first touch area TA1 and the additional touch input in the second touch area TA2 may be used in combination or may be used independently of each other.

When it is determined that the distance between the first touch cell and the second touch area TA2 is greater than or equal to the certain level and the size of the second touch area TA2 is greater than or equal to the certain level, the touch driver TIC may determine the input in the second touch area TA2 as the touch input not intended by the user or a meaningless touch input. In some exemplary embodiments, when it is determined that the distance between the first touch cell and the second touch area TA2 is greater than or equal to about 20 mm and the size of the second touch area TA2 is greater than or equal to about 400 mm$^2$, the touch driver TIC may ignore the input in the second touch area TA2 (operation S260). The touch driver TIC may not supply information about the corresponding touch input to the main processor, and the main processor may not operate due to the touch input not intended by the user.

Further, when it is determined that the distance between the first touch cell and the third touch area TA3 is greater than or equal to about 20 mm and the size of the third touch area TA3 is greater than or equal to about 400 mm$^2$, the touch driver TIC may ignore an input in the third touch area TA3.

Figure 16A:
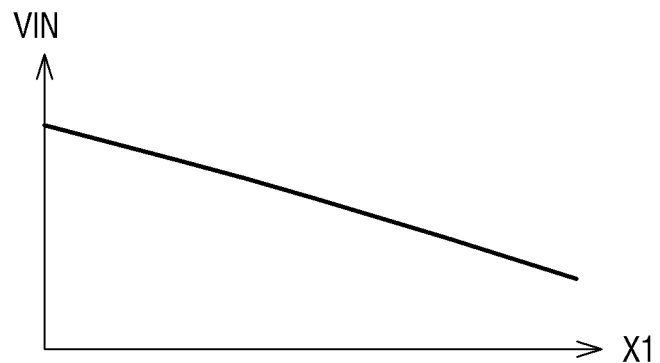
FIGS. 16A-C are graphical depictions illustrating a touch input signal, a gain, and a touch signal of a driving electrode of a display device according to an exemplary embodiment.
Figure 16B:
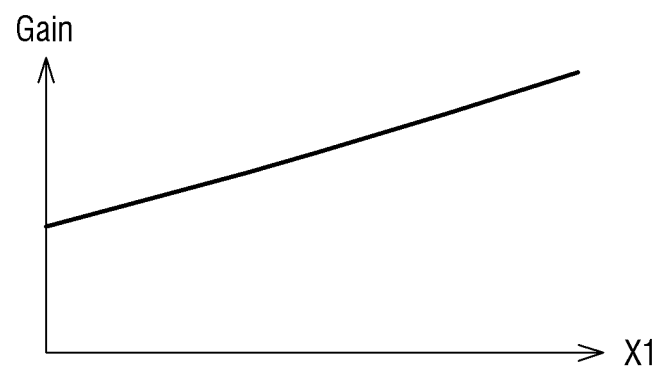
Figure 16C:
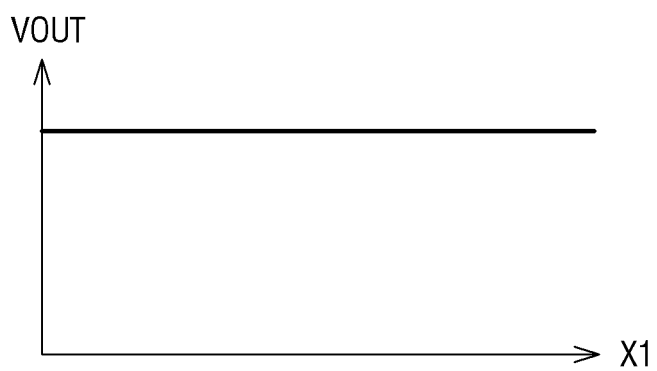

FIGS. 16A-C are graphical depictions illustrating a touch input signal, a gain, and a touch signal of a driving electrode of a display device according to an exemplary embodiment.

The X-axis of each of the graphs may correspond to a length X1 (hereinafter, referred to as a driving electrode length) from one end of a driving electrode TE. The Y-axes of the graphs may correspond to a touch input signal VIN, a gain, and a touch signal VOUT of a touch cell having the predetermined driving electrode length X1. The touch input signal VIN according to the driving electrode length X1 illustrated in FIGS. 16A-C may be changed according to a change in load resistance value according to the driving electrode length X1 when a touch driving voltage having a constant magnitude is applied through driving electrode lines TEL.

Referring to FIGS. 16A-C, a plurality of driving electrodes TE may each extend in a first direction (X-axis direction) and may be spaced apart from each other in a second direction (Y-axis direction) generally perpendicular to the first direction (X-axis direction). One end of each of the plurality of driving electrodes TE may be connected to the driving electrode line TEL on the left side of a first substrate SUB1. In some exemplary embodiments, the driving electrode length X1 may be relatively reduced closer to one end of the driving electrode TE and may be relatively increased closer to the other end opposite to the one end of the driving electrode TE.

The touch driver TIC may increase the gain Gain for the touch input signal VIN generated from the touch cell CE which is adjacent to the other end opposite to the one end of the driving electrode TE to be greater than a gain Gain for the touch input signal VIN generated from the touch cell CE which is adjacent to the one end of the driving electrode TE. Here, the gain may correspond to a ratio of the touch signal VOUT to the touch input signal VIN (Gain=VOUT/VIN). The plurality of touch cells CE may be each electrically connected to the touch driver TIC and may have different load resistance values. In some exemplary embodiments, the load resistance value of the touch cell CE may be proportional to the driving electrode length X1. The load resistance value of the touch cell CE may increase as the driving electrode length X1 increases. When the load resistance value of the touch cell CE is increased, the touch input signal VIN of the corresponding touch cell CE may be reduced.

The touch driver TIC may control the gain for the touch input signal VIN of the plurality of touch cells CE on the basis of a difference in load resistance between the plurality of touch cells CE and the touch driver TIC. Therefore, the touch driver TIC may output the touch signal VOUT having the predetermined magnitude from the plurality of touch cells CE regardless of a difference in load resistance between the plurality of touch cells CE, and thus the touch sensitivity of the display device may be improved.

Figure 17A:
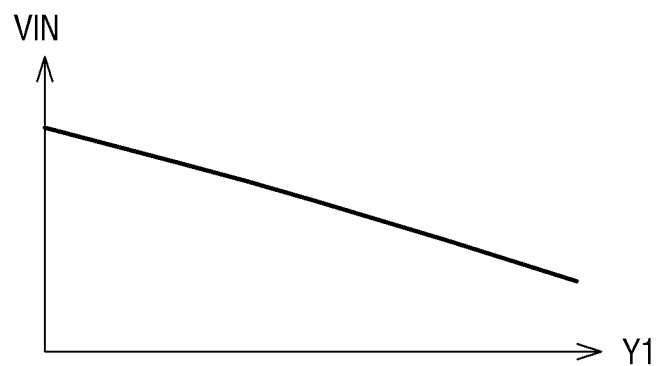
FIGS. 17A-C are graphical depictions illustrating a touch input signal, a gain, and a touch signal of a sensing electrode of a display device according to an exemplary embodiment.
Figure 17B:
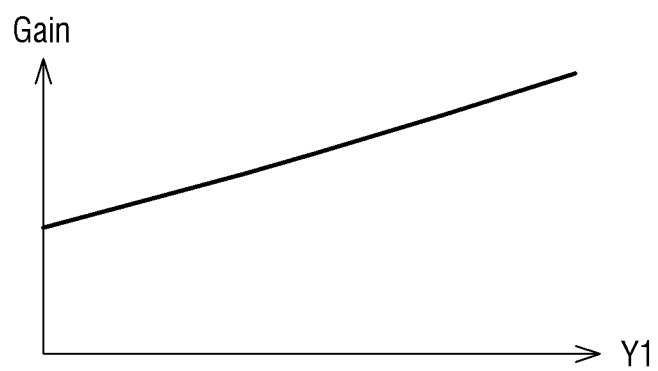
Figure 17C:
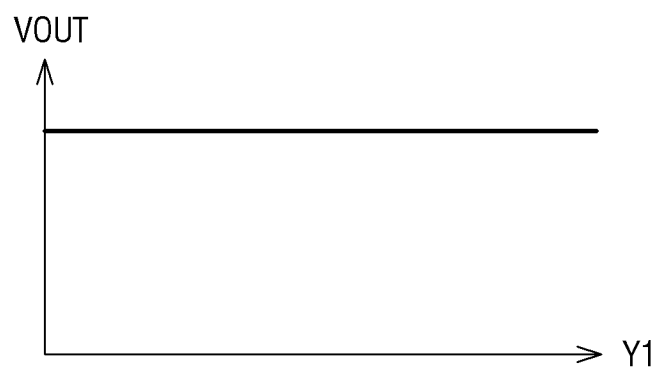

FIGS. 17A-C are graphical depictions illustrating a touch input signal, a gain, and a touch signal of a sensing electrode of a display device according to an exemplary embodiment.

The X-axis of each of the graphs may correspond to a length Y1 (hereinafter, referred to as a sensing electrode length) from one end of a sensing electrode RE. The Y-axes of the graphs may correspond to a touch input signal VIN, a gain Gain, and a touch signal VOUT of a touch cell having the predetermined sensing electrode length Y1. The touch input signal VIN according to the sensing electrode length Y1 illustrated in FIGS. 17A-C may be changed according to a change in load resistance value according to the sensing electrode length Y1 when a driving voltage having a constant magnitude is applied through driving electrode lines TEL and a touch input signal VIN is transmitted through sensing electrode lines REL.

Referring to FIGS. 17A-C, a plurality of sensing electrodes RE may each extend in a second direction (Y-axis direction) and may be spaced apart from each other in a first direction (X-axis direction). One end of each of the plurality of sensing electrodes RE may be connected to the sensing electrode line REL on the upper side of a first substrate SUB1. In some exemplary embodiments, the sensing electrode length Y1 may be relatively reduced closer to one end of the sensing electrode RE and may be relatively increased closer to the other end opposite to the one end of the sensing electrode RE.

The touch driver TIC may increase the gain Gain for the touch input signal VIN generated from the touch cell CE which is adjacent to the other end opposite to the one end of the sensing electrode RE to be greater than a gain Gain for the touch input signal VIN generated from the touch cell CE which is adjacent to the one end of the sensing electrode RE. The plurality of touch cells CE may be each electrically connected to the touch driver TIC and may have different load resistance values. In some exemplary embodiments, the load resistance value of the touch cell CE may be proportional to the sensing electrode length Y1. The load resistance value of the touch cell CE may increase as the sensing electrode length Y1 increases. When the load resistance value of the touch cell CE is increased, the touch input signal VIN of the corresponding touch cell CE may be reduced.

The touch driver TIC may control the gain Gain for the touch input signal VIN of the plurality of touch cells CE on the basis of a difference in load resistance between the plurality of touch cells CE and the touch driver TIC. Therefore, the touch driver TIC may output the touch signal VOUT having a predetermined magnitude from the plurality of touch cells CE regardless of the difference in load resistance between the plurality of touch cells CE, and thus the touch sensitivity of the display device may be improved.

Figure 18A:
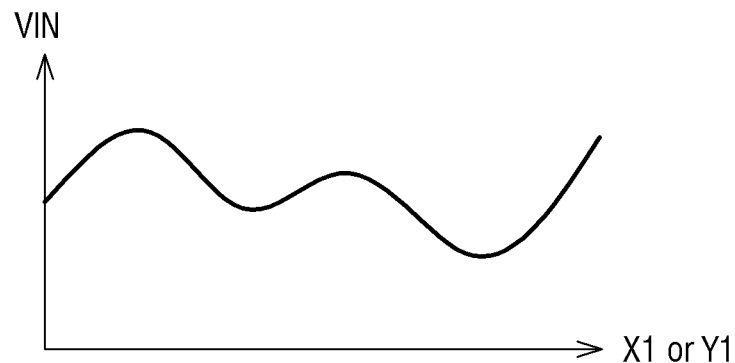
FIGS. 18A-C are graphical depictions illustrating a touch input signal, a gain, and a touch signal of the driving electrode or the sensing electrode of the display device according to another exemplary embodiment.
Figure 18B:
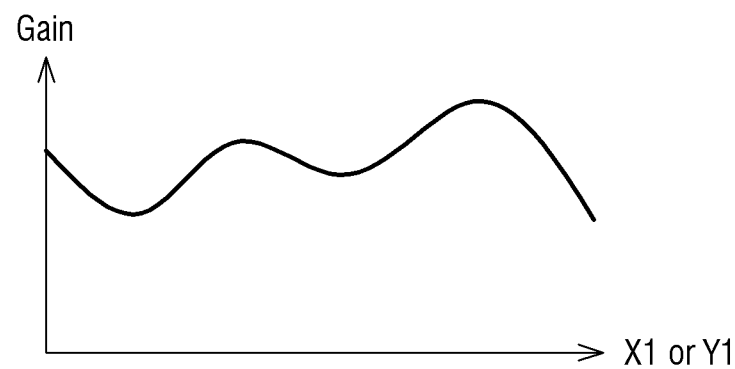
Figure 18C:
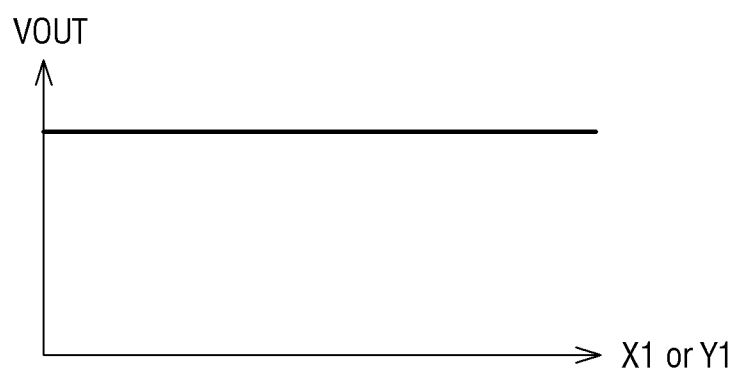

FIGS. 18A-C are graphical depictions illustrating a touch input signal, a gain, and a touch signal of the driving electrode or the sensing electrode of the display device according to another exemplary embodiment.

The X-axis of each of the graphs may correspond to a length X1 (hereinafter, referred to as a driving electrode length) from one end of a driving electrode TE, or correspond to a length Y1 (hereinafter, referred to as a sensing electrode length) from one end of a sensing electrode RE. The Y-axes of the graphs may correspond to a touch input signal VIN, a gain Gain, and a touch signal VOUT of a touch cell having the predetermined driving electrode length X1 or the predetermined sensing electrode length Y1. The touch input signal VIN illustrated in FIGS. 18A-C may be changed according to the change in load resistance value according to the driving electrode length X1 or the sensing electrode length Y1 when a driving voltage having a constant magnitude is applied through driving electrode lines TEL and a touch input signal VIN is transmitted through sensing electrode lines REL.

Referring to FIGS. 18A-C, the touch driver TIC may increase the gain Gain for the touch input signal VIN generated from some touch cells when a load resistance between some touch cells of the plurality of touch cells CE and the touch driver TIC increases relatively, and the touch driver TIC may reduce the gain Gain for the touch input signal VIN generated from some other touch cells when a load resistance between some other touch cells of the plurality of touch cells CE and the touch driver TIC decreases relatively.

Therefore, the touch driver TIC may output the touch signal VOUT having the predetermined magnitude from the plurality of touch cells CE regardless of a difference in load resistance between the plurality of touch cells CE, and thus the touch sensitivity of the display device may be improved.

Figure 19:
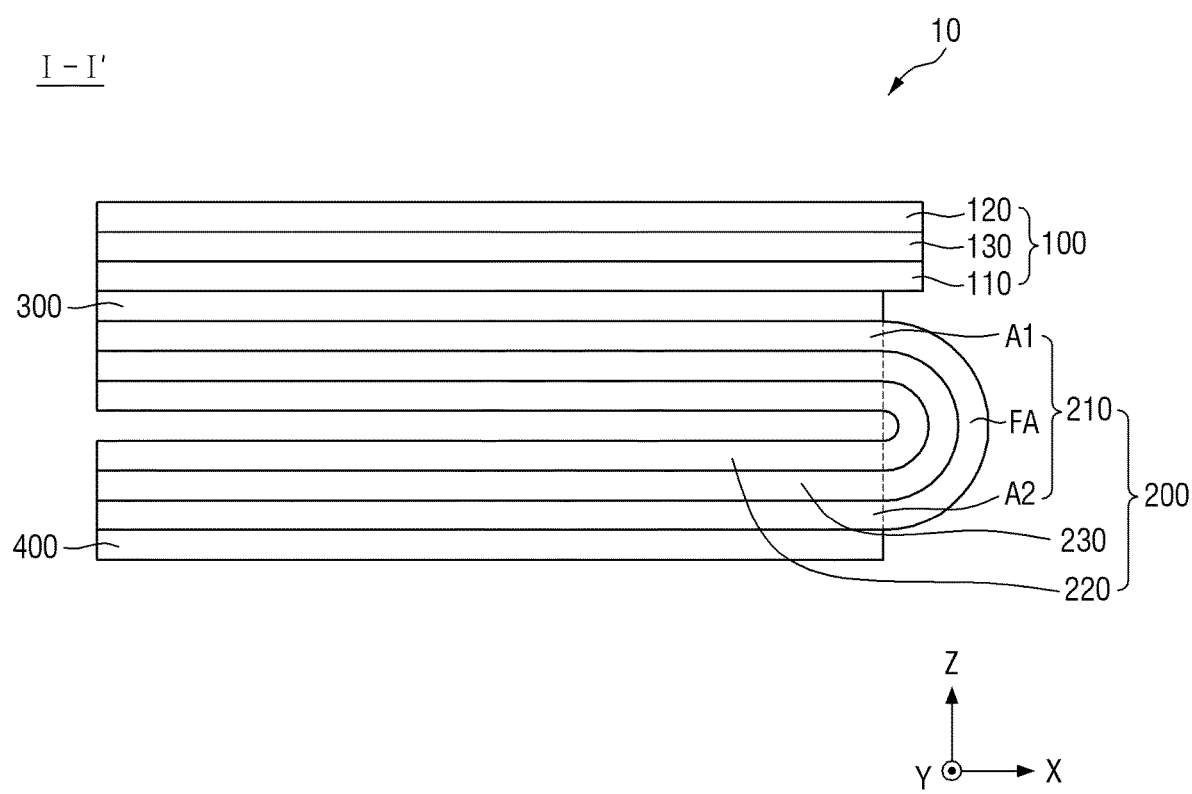
FIG. 19 is a cross-sectional view of another exemplary embodiment of the foldable display device taken along line I-I' of FIG. 1.
Figure 20:
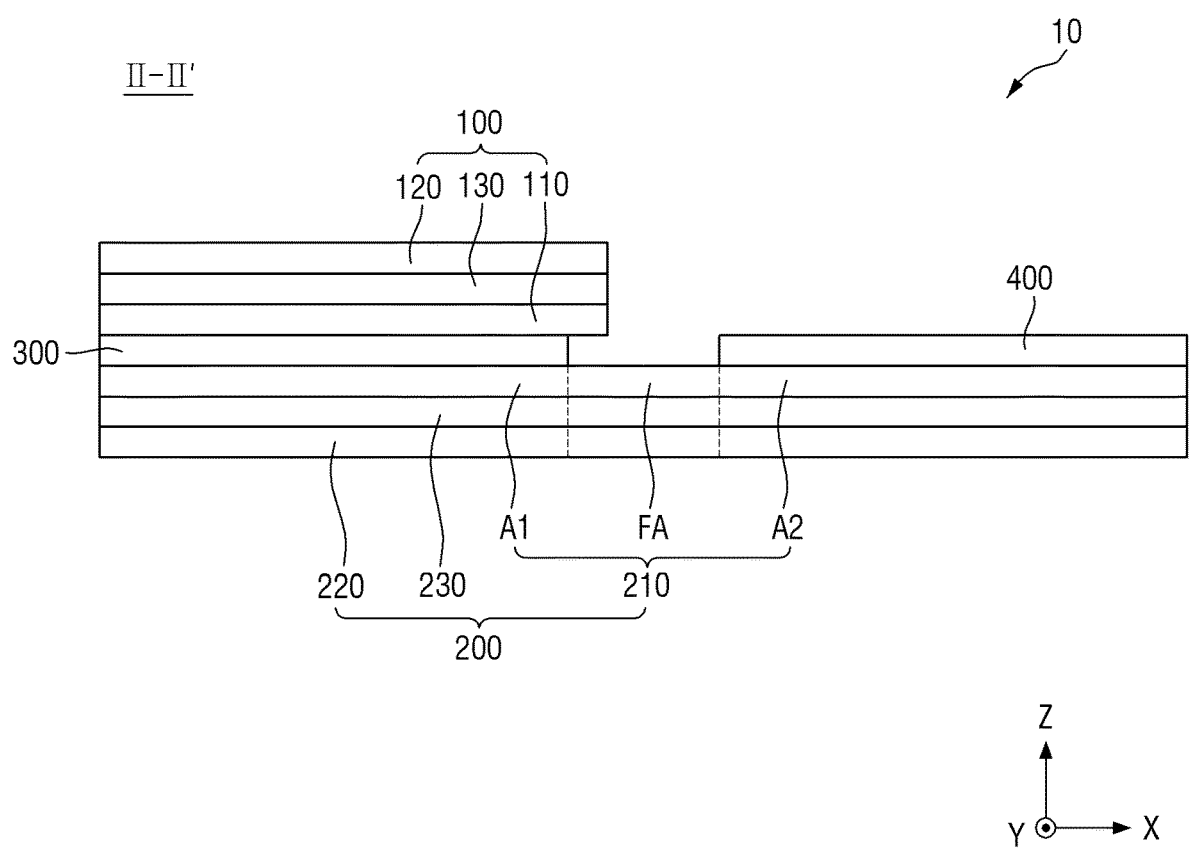
FIG. 20 is a cross-sectional view of the foldable display device of FIG. 19 in an unfolded position taken along line II-II' of FIG. 2.
Figure 21:
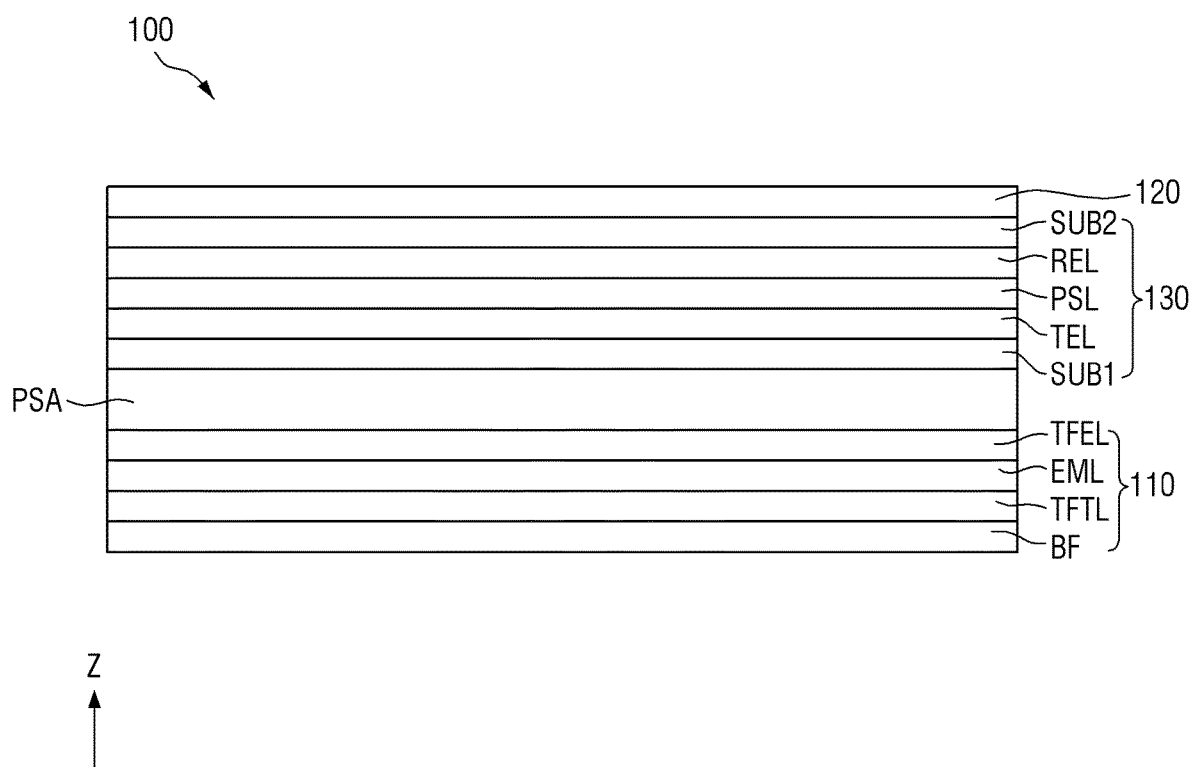
FIG. 21 is a cross-sectional view of another exemplary embodiment of the first display unit of the foldable display device of FIG. 20.

FIG. 19 is a cross-sectional view of another exemplary embodiment of the foldable display device taken along line I-I' of FIG. 1. FIG. 20 is a cross-sectional view of the foldable display device of FIG. 19 in an unfolded position taken along line II-II' of FIG. 2. FIG. 21 is a cross-sectional view of another exemplary embodiment of the first display unit of the foldable display device of FIG. 20.

The display device of FIGS. 19 to 21 is different from the display device of FIGS. 3 to 5 in that a first display panel 110 and a first pressure sensor 130 are disposed in a different manner, and thus the same components as the above-described configuration will be briefly described or be omitted to avoid redundancy.

Referring to FIGS. 19 to 21, the display device 10 may include a first display unit 100, a second display unit 200, a first panel lower member 300, and a second panel lower member 400.

The first display unit 100 may display an image in a third direction (Z-axis direction). The first display unit 100 may be disposed on one surface of the first panel lower member 300 and supported by the first panel lower member 300. The first display unit 100 may include a first display panel 110, a first cover window 120, and a first pressure sensor 130.

The first pressure sensor 130 may be disposed above the first display panel 110, and the first cover window 120 may be disposed above the first pressure sensor 130. The first cover window 120 may cover an upper surface of the first pressure sensor 130 to protect the first pressure sensor 130 and the first display panel 110. The first cover window 120 may be attached onto the first pressure sensor 130 by a transparent adhesive member. The first cover window 120 may correspond to a surface of a first display region DA1 and may be brought into direct contact with a user's body.

The first pressure sensor 130 may be disposed above the first display panel 110 and below the first cover window 120. The first pressure sensor 130 may detect a user's touch generated on the first cover window 120. The first pressure sensor 130 may overlap substantially the entire surface of the first display panel 110. The first pressure sensor 130 may overlap substantially the entire surface of the first cover window 120. In some exemplary embodiments, the first pressure sensor 130 may include a plurality of touch cells which overlap the entire surface of the first display panel 110 or the entire surface of the first cover window 120. Of the plurality of touch cells of the first pressure sensor 130, the resistance value of the touch cell that is subjected to pressure by a touch may be changed according to the magnitude of the pressure. Therefore, the first pressure sensor 130 may detect a position at which the touch is generated on the basis of a position of the touch cell of which the resistance value is changed and detect the magnitude of the touch pressure on the basis of the degree of change in the resistance value. The first pressure sensor 130 may be disposed adjacent to the first cover window 120 and thus touch sensitivity may be improved.

The second display unit 200 may be folded as illustrated in FIG. 19 or unfolded as illustrated in FIG. 20 according to a state of a folding region FA. The second display unit 200 may display an image in a direction opposite to the third direction (Z-axis direction) in the unfolded state. The second display unit 200 may include a second display panel 210, a second cover window 220, and a second pressure sensor 230.

The second display panel 210 may include a first region A1, a second region A2, and a folding region FA disposed between the first region A1 and the second region A2. In some exemplary embodiments, the second display panel 210 may include a flexible substrate which is bendable, foldable, or rollable, and thus may be easily folded at the folding region FA.

The first region A1 of the second display panel 210 may be disposed on the other surface opposite to one surface of the first panel lower member 300 and supported by the first panel lower member 300. The first region A1 of the second display panel 210 and the first display panel 110 may be opposite to each other with the first panel lower member 300 interposed therebetween.

The second region A2 of the second display panel 210 may be connected to the first region A1 through the folding region FA. When the folding region FA of the second display panel 210 is folded as illustrated in FIG. 19, the second region A2 of the second display panel 210 may overlap the first region A1 in the third direction (Z-axis direction). When the folding region FA of the second display panel 210 is unfolded as illustrated in FIG. 20, the second region A2 of the second display panel 210 may be generally coplanar with the folding region FA and the first region A1.

The second region A2 of the second display panel 210 may be disposed on one surface of the second panel lower member 400 and supported by the second panel lower member 400.

The second cover window 220 may be disposed on one surface of the second pressure sensor 230. The second cover window 220 may cover the one surface of the second pressure sensor 230 to protect the second pressure sensor 230. The second cover window 220 may be attached to the one surface of the second pressure sensor 230 by a transparent adhesive member. The second cover window 220 may correspond to a surface of the second display region DA2 and may be brought into direct contact with the user's body. A portion of the second cover window 220 may overlap the folding region FA of the second display panel 210, and at least a portion of the second cover window 220 may be formed to be flexible.

The second pressure sensor 230 may be disposed between the second display panel 210 and the second cover window 220. The second pressure sensor 230 may detect the user's touch generated on the second cover window 220. The second pressure sensor 230 may overlap substantially the entire surface of the second display panel 210. The second pressure sensor 230 may overlap substantially the entire surface of the second cover window 220. In some exemplary embodiments, the second pressure sensor 230 may include a plurality of touch cells which overlap the entire surface of the second display panel 210 or the entire surface of the second cover window 220. Of the plurality of touch cells of the second pressure sensor 230, the resistance value of the touch cell that is subjected to pressure by a touch may be changed according to the magnitude of the pressure. Therefore, the second pressure sensor 230 may detect a position at which the touch is generated on the basis of the position of the touch cell whose resistance value is changed and detect the magnitude of touch pressure on the basis of a degree of change in the resistance value.

As illustrated in FIG. 21, the first display unit 100 may include the first display panel 110, which may include a base film BF, a thin film transistor layer TFTL, a light-emitting element layer EML, and a thin film encapsulation layer TFEL. The first pressure sensor 130 may include a first substrate SUB1, a driving electrode layer TEL, a pressure sensing layer PSL, a sensing electrode layer REL, and a second substrate SUB2. The first display panel 110 and the first pressure sensor 130 may be bonded to each other by an adhesive layer PSA.

Figure 22:
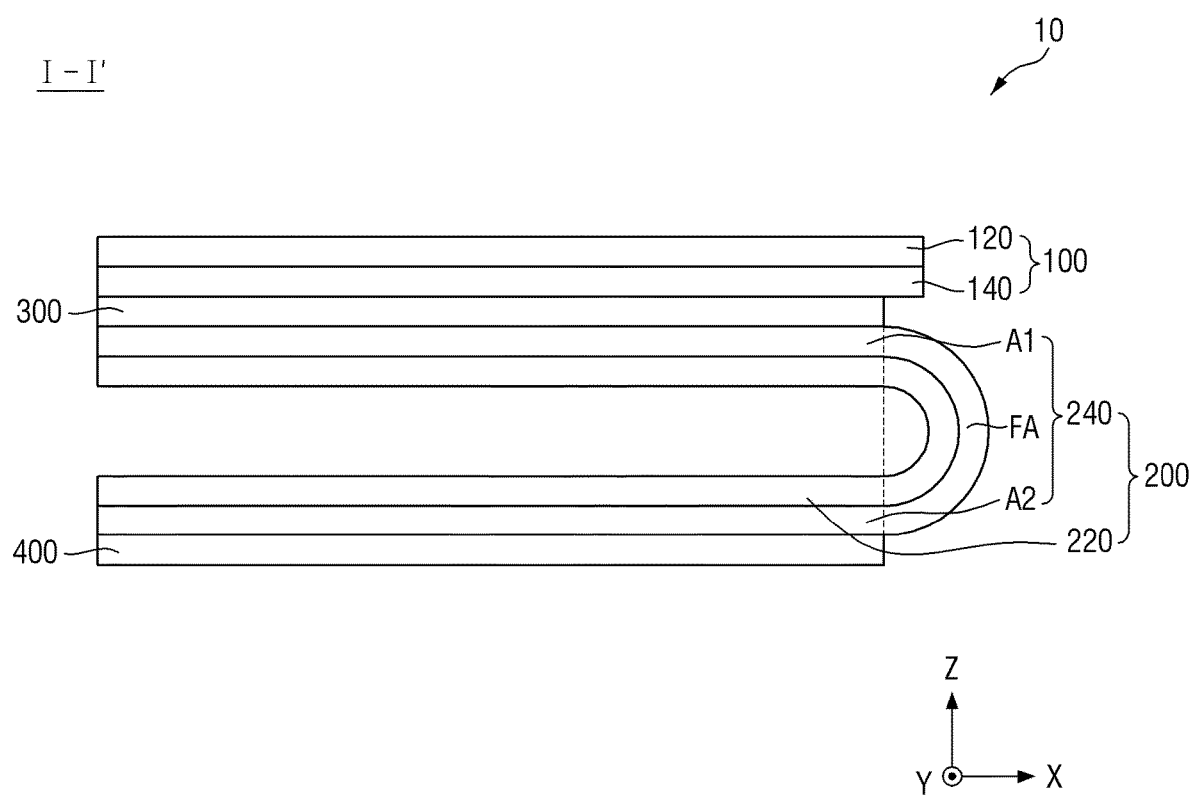
FIG. 22 is a cross-sectional view of still another exemplary embodiment of the foldable display device taken along line of FIG. 1 in a folded position.
Figure 23:
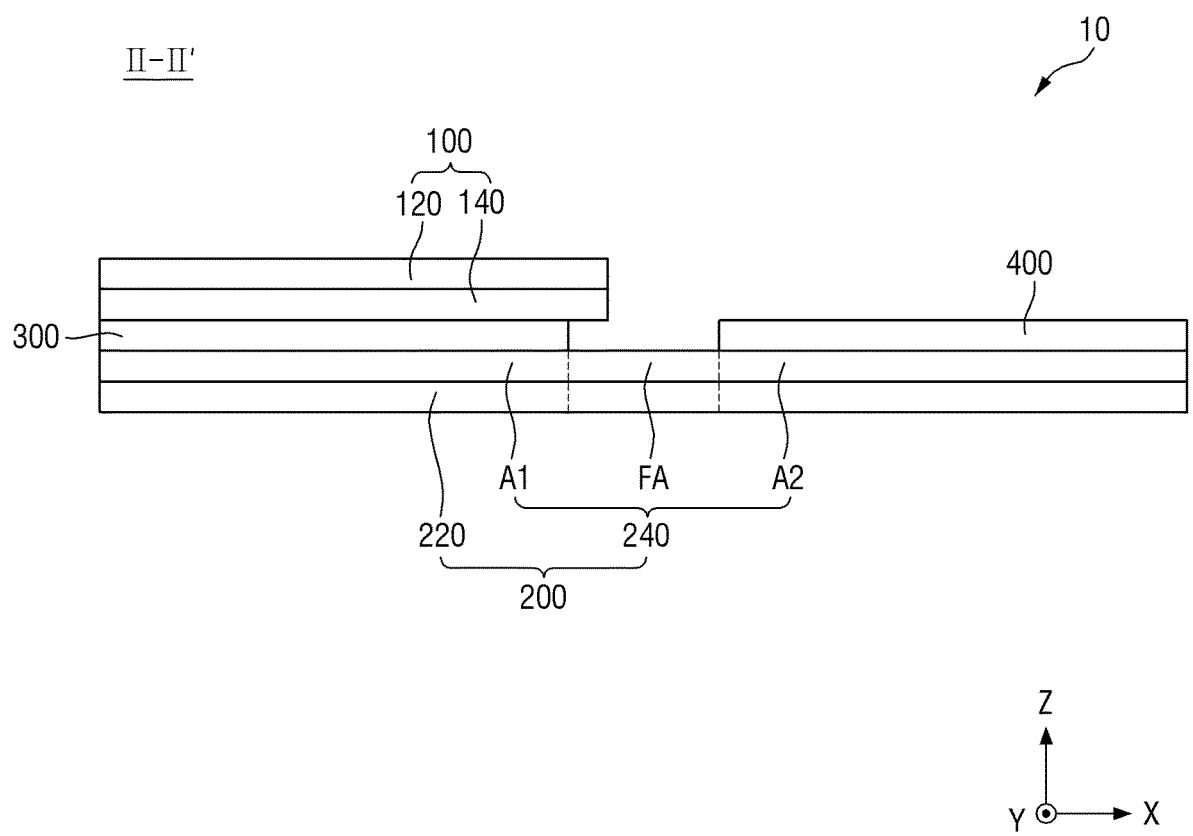
FIG. 23 is a cross-sectional view of the foldable display device of FIG. 22 in an unfolded position taken along line II-II' of FIG. 2.
Figure 24:
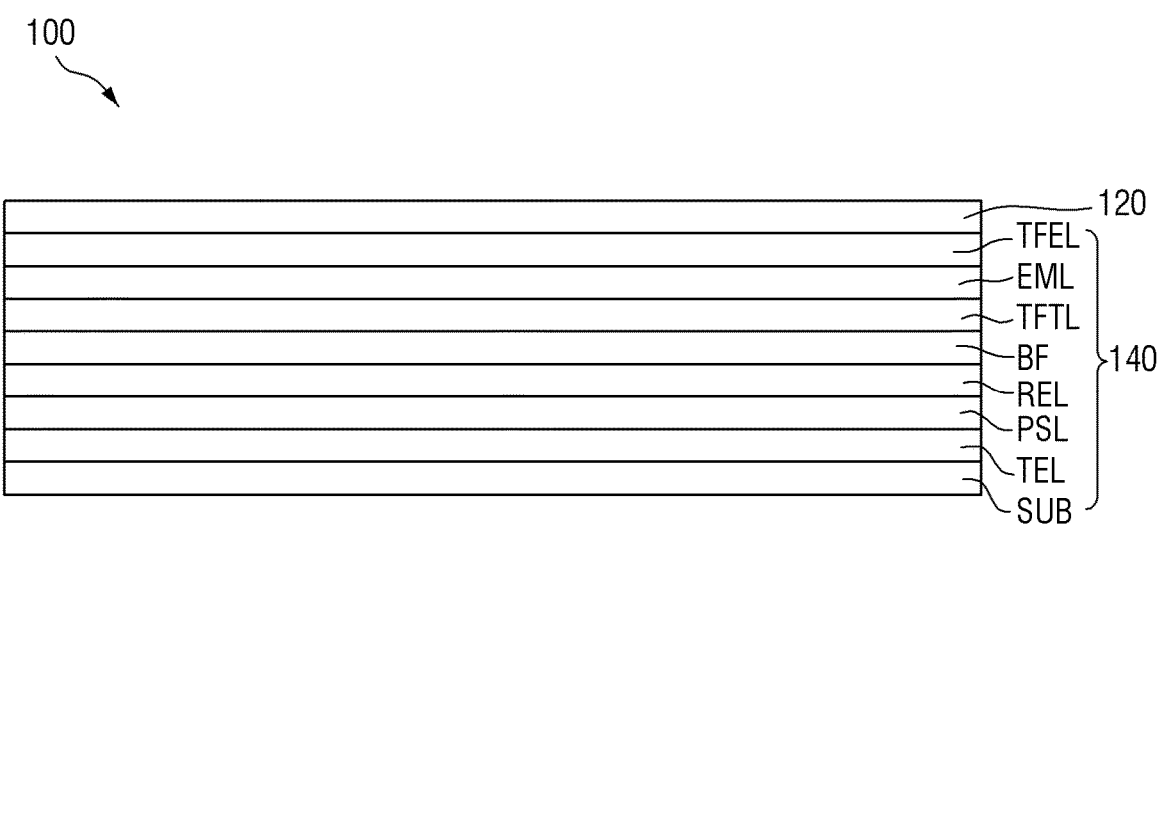
FIG. 24 is a cross-sectional view of still another exemplary embodiment of the first display unit of the foldable display device of FIG. 22.

FIG. 22 is a cross-sectional view of still another exemplary embodiment of the foldable display device taken along line I-I' of FIG. 1 in a folded position. FIG. 23 is a cross-sectional view of the foldable display device of FIG. 22 in an unfolded position taken along line II-II' of FIG. 2. FIG. 24 is a cross-sectional view of still another exemplary embodiment of the first display unit of the foldable display device of FIG. 22.

The display device of FIGS. 22 to 24 includes a first touch screen panel 140 in which a first display panel 110 and a first pressure sensor 130 are combined and a second touch screen panel 240 in which a second display panel 210 and a second pressure sensor 230 are combined, and thus the same components as the above-described configuration will be briefly described or be omitted to avoid redundancy.

Referring to FIGS. 22 to 24, the display device may include a first display unit 100, a second display unit 200, a first panel lower member 300, and a second panel lower member 400.

The first display unit 100 may display an image in a third direction (Z-axis direction). The first display unit 100 may be disposed on one surface of the first panel lower member 300 and supported by the first panel lower member 300. The first display unit 100 may include a first cover window 120 and a first touch screen panel 140.

The first cover window 120 may be disposed above the first touch screen panel 140. The first cover window 120 may cover an upper surface of the first touch screen panel 140 to protect the first touch screen panel 140. The first cover window 120 may be attached onto the first touch screen panel 140 by a transparent adhesive member. The first cover window 120 may correspond to a surface of a first display region DA1 and may be brought into direct contact with a user's body.

The first touch screen panel 140 may be disposed below the first cover window 120. The first touch screen panel 140 may detect the user's touch generated on the first cover window 120. The first touch screen panel 140 may overlap substantially the entire surface of the first cover window 120. In some exemplary embodiments, the first touch screen panel 140 may include a plurality of touch cells which overlap the entire surface of the first cover window 120. Of the plurality of touch cells of the first touch screen panel 140, a resistance value of the touch cell that is subjected to pressure by a touch may be changed according to the magnitude of the pressure. Therefore, the first touch screen panel 140 may detect a position at which the touch is generated on the basis of the position of the touch cell of which the resistance value is changed and detect the magnitude of touch pressure on the basis of a degree of change in the resistance value. The first touch screen panel 140 is formed in combination of the configurations of the first display panel 110 and the first pressure sensor 130 illustrated in FIGS. 3 to 5, and thus the thickness of the display device may be reduced and the display device may be made compact.

The second display unit 200 may be folded as illustrated in FIG. 22 or unfolded as illustrated in FIG. 23 according to a state of a folding region FA. The second display unit 200 may display an image in a direction opposite to the third direction (Z-axis direction) in the unfolded state. The second display unit 200 may include a second cover window 220 and a second touch screen panel 240.

The second cover window 220 may be disposed on one surface of the second touch screen panel 240. The second cover window 220 may cover the one surface of the second touch screen panel 240 to protect the second touch screen panel 240. The second cover window 220 may be attached to the one surface of the second touch screen panel 240 by a transparent adhesive member. The second cover window 220 may correspond to a surface of a second display region DA2 and may be brought into direct contact with a user's body. A portion of the second cover window 220 may overlap the folding region FA of the second touch screen panel 240, and at least a portion of the second cover window 220 may be formed to be flexible.

The second touch screen panel 240 may include a first region A1, a second region A2, and a folding region FA disposed between the first region A1 and the second region A2. In some exemplary embodiments, the second touch screen panel 240 may include a flexible substrate which is bendable, foldable, or rollable and thus may be easily folded at the folding region FA.

The first region A1 of the second touch screen panel 240 may be disposed on the other surface opposite to one surface of the first panel lower member 300 and supported by the first panel lower member 300. The first region A1 of the second touch screen panel 240 and the first display panel 110 may be opposite to each other with the first panel lower member 300 interposed therebetween.

The second region A2 of the second touch screen panel 240 may be connected to the first region A1 through the folding region FA. When the folding region FA of the second touch screen panel 240 is folded as illustrated in FIG. 22, the second region A2 of the second touch screen panel 240 may overlap the first region A1 in the third direction (Z-axis direction). When the folding region FA of the second touch screen panel 240 is unfolded as illustrated in FIG. 23, the second region A2 of the second touch screen panel 240 may be generally coplanar with the folding region FA and the first region A1.

The second region A2 of the second touch screen panel 240 may be disposed on one surface of the second panel lower member 400 and supported by the second panel lower member 400.

The second touch screen panel 240 may detect the user's touch generated on the second cover window 220. The second touch screen panel 240 may overlap substantially the entire surface of the second touch screen panel 240. In some exemplary embodiments, the second touch screen panel 240 may include a plurality of touch cells which overlap the entire surface of the second cover window 220. Of the plurality of touch cells of the second touch screen panel 240, the resistance value of the touch cell that is subjected to pressure by a touch may be changed according to the magnitude of the pressure. Therefore, the second touch screen panel 240 may detect a position at which the touch is generated on the basis of the position of the touch cell of which the resistance value is changed and detect the magnitude of touch pressure on the basis of a degree of change in the resistance value.

As illustrated in FIG. 24, the first touch screen panel 140 may be formed by sequentially stacking a substrate SUB, a driving electrode layer TEL, a pressure sensing layer PSL, a sensing electrode layer REL, a base film BF, a thin film transistor layer TFTL, a light-emitting element layer EML, and a thin film encapsulation layer TFEL. One surface of the base film BF of the first touch screen panel 140 may support the thin film transistor layer TFTL and the light-emitting element layer EML, and the other surface of the base film BF may be bonded to the substrate SUB. The driving electrode layer TEL, the pressure sensing layer PSL, and the sensing electrode layer REL, which are disposed between the other surface of the base film BF and the substrate SUB, may form a plurality of touch cells.

Therefore, the first touch screen panel 140 is formed in combination of the configurations of the first display panel 110 and the first pressure sensor 130 illustrated in FIGS. 3 to 5, and thus the thickness of the display device may be reduced and the display device may be made compact.

According to the principles and exemplary embodiments of the invention, resistance values of a plurality of touch cells including a plurality of driving electrodes, a plurality of sensing electrodes, and a pressure sensing layer of the pressure sensor can be changed according to the pressure applied to the plurality of touch cells. Therefore, the pressure sensor and the display device including the same can sense a change in current value or voltage value of a touch input signal according to a change in resistance value of the plurality of touch cells connected to sensing electrode lines to sense the pressure when pressed by a hand of the user, and thus the pressure sensor can be used as an input device which senses a user's touch input.

According to some exemplary embodiments, the pressure sensor can distinguish a touch input intended by a user from a touch input not intended by the user. In some exemplary embodiments, the pressure sensor can compare magnitudes of touch pressures of a plurality of touch areas and determine the touch area having a relatively large magnitude of touch pressure as a touch input intended by the user and determine the touch area having a relatively small magnitude of touch pressure as a touch input not intended by the user. Therefore, the pressure sensor and the display device including the same can accurately detect the user's touch input, and thus reliability can be improved.

According to some exemplary embodiments, each of a plurality of touch cells can be electrically connected to a touch driver to have different load resistance values. The pressure sensor can control a gain for a touch input signal of a plurality of touch cells on the basis of a difference in load resistance between the plurality of touch cells and the touch driver. Therefore, the pressure sensor and the display device including the same can output a touch signal having a predetermined magnitude from the plurality of touch cells and can accurately detect a user's touch input.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A pressure sensor for a display device, comprising:
a plurality of touch cells having a plurality of driving electrodes disposed on a first substrate, a plurality of sensing electrodes disposed on a second substrate overlapping the first substrate, and a pressure sensing layer interposed between the plurality of driving electrodes and the plurality of sensing electrodes, the plurality of driving electrodes and the plurality of sensing electrodes overlapping each other; and
a touch driver to drive the plurality of touch cells and to detect touch pressure of the plurality of touch cells;
wherein, when a plurality of touch areas including at least one touch cell are detected, the touch driver is configured to compare magnitude magnitudes of touch pressures of the plurality of touch areas and to ignore at least one touch input in at least one touch area,
wherein the touch driver is configured to compare a magnitude of touch pressure of a first touch cell having a maximum value in a first touch area to a magnitude of touch pressure of a second touch cell in a second touch area and to generate a touch signal of the first touch cell or a touch signal of the second touch cell, and when the magnitude of the touch pressure of the second touch cell is less than or equal to about 90% of the magnitude of the touch pressure of the first touch cell, the touch driver is configured to ignore a touch input in the second touch area.

2. The pressure sensor of claim 1, wherein the touch driver is configured to detect touch cells having a maximum value of magnitude of touch pressure in each of the plurality of touch areas and to compare the magnitudes of the touch pressures of the detected touch cells.

3. The pressure sensor of claim 1, wherein, when the magnitude of the touch pressure of the first touch cell is greater than the magnitude of the touch pressure of the second touch cell, the touch driver is configured to generate a first touch signal based on a position of the first touch cell and the magnitude of the touch pressure of the first touch cell.

4. The pressure sensor of claim 3, wherein, when the magnitude of the touch pressure of the second touch cell exceeds about 90% of the magnitude of the touch pressure of the first touch cell, the touch driver is configured to additionally generate a second touch signal based on a position of the second touch cell and the magnitude of the touch pressure of the second touch cell.

5. The pressure sensor of claim 3, wherein, when a distance between the first touch cell and the second touch area is greater than or equal to a predetermined level and a size of the second touch area is greater than or equal to a predetermined level, the touch driver is configured to ignore a touch input in the second touch area.

6. The pressure sensor of claim 3, wherein, when a distance between the first touch cell and the second touch area is at least about 20 mm and a size of the second touch area is at least about 400 $mm^2$, the touch driver is configured to ignore a touch input in the second touch area.

7. The pressure sensor of claim 3, wherein, when a distance between the first touch cell and the second touch area is less than about 20 mm or a size of the second touch area is less than about 400 $mm^2$, the touch driver is configured to additionally generate a second touch signal based on a position of the second touch cell and the magnitude of the touch pressure of the second touch cell.

8. The pressure sensor of claim 1, wherein, when the magnitude of the touch pressure of the second touch cell is smaller than the magnitude of the touch pressure of the first touch cell, the touch driver is configured to ignore a touch input in the second touch area.

9. The pressure sensor of claim 1, wherein:
the plurality of driving electrodes extend in a first direction on the first substrate and are spaced apart from each other in a second direction generally perpendicular to the first direction; and
the plurality of sensing electrodes extend in the second direction on the second substrate and are spaced apart from each other in the first direction.

10. The pressure sensor of claim 1, wherein the touch driver is electrically connected to a first end of each of the plurality of driving electrodes through driving electrode lines and is configured to increase a gain for a touch input signal generated from a touch cell adjacent to a second end opposite to the first end of a respective driving electrode of the plurality of electrodes to be greater than a gain for a touch input signal generated from a touch cell which is adjacent to the first end of the respective driving electrode.

11. The pressure sensor of claim 1, wherein the touch driver is electrically connected to a first end of each of the plurality of sensing electrodes through sensing electrode lines and is configured to increase a gain for a touch input signal generated from a touch cell adjacent to a second end opposite to the first end of a respective sensing electrode of the plurality of sensing electrodes to be greater than a gain for a touch input signal generated from a touch cell adjacent to the first end of the respective sensing electrode.

12. The pressure sensor of claim 1, wherein, when a load resistance between some touch cells of the plurality of touch cells and the touch driver is relatively increased, the touch driver is configured to increase a gain for a touch input signal generated from the some touch cells, and when a load resistance between some other touch cells of the plurality of touch cells and the touch driver is relatively reduced, the touch driver is configured to decrease a gain for a touch input signal generated from the some other touch cells.

13. A pressure sensor for a display device, comprising:
a plurality of touch cells having a plurality of driving electrodes disposed on a first substrate, a plurality of sensing electrodes disposed on a second substrate overlapping the first substrate, and a pressure sensing layer interposed between the plurality of driving electrodes and the plurality of sensing electrodes overlapping each other; and
a touch driver to drive the plurality of touch cells and to detect touch pressure of the plurality of touch cells;
wherein the touch driver is configured to control a gain for a touch input signal of each of the plurality of touch cells based on a load resistance between each of the plurality of touch cells and the touch driver, and
wherein, when a load resistance between some touch cells of the plurality of touch cells and the touch driver is relatively increased, the touch driver is configured to increase a gain for a touch input signal generated from the some touch cells, and when a load resistance between some other touch cells of the plurality of touch cells and the touch driver is relatively reduced, the touch driver is configured to decrease a gain for a touch input signal generated from the some other touch cells.

14. The pressure sensor of claim 13, wherein:
the plurality of driving electrodes extend in a first direction on the first substrate and are spaced apart from each other in a second direction perpendicular to the first direction; and
the plurality of sensing electrodes extend in the second direction on the second substrate and are spaced apart from each other in the first direction.

15. The pressure sensor of claim 13, wherein the touch driver is electrically connected to a first end of each of the plurality of driving electrodes through a driving electrode line and is configured to increase a gain for a touch input signal generated from a touch cell adjacent to a second end opposite to the first end of a respective driving electrode of the plurality of driving electrodes to be greater than a gain for a touch input signal generated from a touch cell adjacent to the first end of the respective driving electrode.

16. The pressure sensor of claim 13, wherein the touch driver is electrically connected to a first end of each of the plurality of sensing electrodes through a sensing electrode line and is configured to increase a gain for a touch input signal generated from a touch cell adjacent to a second end opposite to the first end of a respective sensing electrode of the plurality of sensing electrodes to be greater than a gain for a touch input signal generated from a touch cell adjacent to the first end of the respective sensing electrode.

17. A display device comprising:
a display panel to display an image; and
a pressure sensor disposed on one surface of the display panel;
wherein the pressure sensor comprises:
a plurality of touch cells having a plurality of driving electrodes disposed on a first substrate, a plurality of sensing electrodes disposed on a second substrate overlapping the first substrate, and a pressure sensing layer interposed between the plurality of driving electrodes and the plurality of sensing electrodes overlapping each other, and
a touch driver to drive the plurality of touch cells and to detect touch pressure of the plurality of touch cells,
wherein when a plurality of touch areas including at least one touch cell is detected, the touch driver is configured to compare magnitudes of touch pressures of the plurality of touch areas and to ignore at least one touch input in at least one touch area,
wherein the touch driver is configured to compare a magnitude of touch pressure of a first touch cell having a maximum value in a first touch area to a magnitude of touch pressure of a second touch cell in a second touch area and to generate a touch signal of the first touch cell or a touch signal of the second touch cell, and
when the magnitude of the touch pressure of the second touch cell is less than or equal to about 90% of the magnitude of the touch pressure of the first touch cell, the touch driver is configured to ignore a touch input in the second touch area.

* * * * *